United States Patent
Snyder et al.

(10) Patent No.: US 11,097,484 B1
(45) Date of Patent: Aug. 24, 2021

(54) SYSTEM AND METHOD FOR HYBRID ADDITIVE AND SUBTRACTIVE MANUFACTURING WITH PART MOVEMENT

(71) Applicant: MADE IN SPACE, INC., Moffett Field, CA (US)

(72) Inventors: Michael P. Snyder, Jacksonville, FL (US); William Brandon Kirkland, St. Augustine, FL (US); Douglas Alan Marsh, Jacksonville, FL (US); Patrick F. Flowers, Jacksonville, FL (US)

(73) Assignee: MADE IN SPACE, INC., Moffett Field, CA (US)

(*) Notice: Subject to any disclaimer, the term of this patent is extended or adjusted under 35 U.S.C. 154(b) by 30 days.

(21) Appl. No.: 16/275,301

(22) Filed: Feb. 13, 2019

Related U.S. Application Data

(60) Provisional application No. 62/629,885, filed on Feb. 13, 2018.

(51) Int. Cl.
| | |
|---|---|
| *B29C 64/379* | (2017.01) |
| *B29C 64/393* | (2017.01) |
| *B29C 64/25* | (2017.01) |
| *B22F 3/00* | (2021.01) |
| *B33Y 10/00* | (2015.01) |
| *B33Y 30/00* | (2015.01) |
| *B33Y 40/00* | (2020.01) |

(52) U.S. Cl.
CPC ............ *B29C 64/379* (2017.08); *B22F 3/003* (2013.01); *B29C 64/25* (2017.08); *B29C 64/393* (2017.08); *B22F 2202/09* (2013.01); *B33Y 10/00* (2014.12); *B33Y 30/00* (2014.12); *B33Y 40/00* (2014.12)

(58) Field of Classification Search
CPC ..... B29C 64/379; B29C 64/25; B29C 64/393; B22F 3/003; B22F 2202/09; B33Y 40/00; B33Y 10/00; B33Y 30/00
See application file for complete search history.

(56) References Cited

U.S. PATENT DOCUMENTS

| | | | |
|---|---|---|---|
| 6,162,364 A | 12/2000 | Tillotson et al. | |
| 6,325,806 B1 | 12/2001 | Fox | |
| 2017/0021565 A1* | 1/2017 | Deaville | B29C 70/386 |
| 2017/0329316 A1* | 11/2017 | Morimura | B23Q 39/025 |
| 2018/0071949 A1* | 3/2018 | Giles | B33Y 10/00 |
| 2018/0126668 A1* | 5/2018 | El-Siblani | B29C 64/255 |
| 2018/0141174 A1* | 5/2018 | Mori | B22F 3/1055 |
| 2018/0370117 A1* | 12/2018 | Gardiner | B29C 64/40 |
| 2019/0072931 A1* | 3/2019 | Bank | B62D 57/032 |
| 2019/0270239 A1* | 9/2019 | Stubler | B29C 64/106 |
| 2019/0329490 A1* | 10/2019 | Robrecht | B33Y 30/00 |

(Continued)

*Primary Examiner* — Nahida Sultana
(74) *Attorney, Agent, or Firm* — Terry M. Sanks, Esq.; Beusse Sanks, PLLC

(57) ABSTRACT

A system is disclosed including a robotic arm movable about a rotational axis to at least one of move and reposition a part at least one of during part creation and after part creation in a micro-gravity environment, wherein creation is performed by at least one of a polymer-based additive manufacturing subsystem and a metallic-based additive manufacturing subsystem and a gripping device attached to the robotic arm which holds the part during at least one of part creation and after part creation. Another system and method are also disclosed.

23 Claims, 22 Drawing Sheets

(56) References Cited

U.S. PATENT DOCUMENTS

| | | | | |
|---|---|---|---|---|
| 2019/0358983 | A1* | 11/2019 | Busbee | B41M 5/502 |
| 2020/0070249 | A1* | 3/2020 | Ozdoganlar | B22F 3/24 |
| 2020/0130270 | A1* | 4/2020 | Morris | B29C 64/106 |
| 2020/0188999 | A1* | 6/2020 | Trimmer | B22F 10/20 |
| 2020/0324472 | A1* | 10/2020 | Barnes | B29C 64/241 |
| 2020/0376581 | A1* | 12/2020 | Humphreys | B23K 9/0035 |

\* cited by examiner

SYSTEM AND METHOD FOR HYBRID ADDITIVE AND SUBTRACTIVE MANUFACTURING WITH PART MOVEMENT

CROSS-REFERENCE TO RELATED APPLICATIONS

This application claims the benefit of U.S. Provisional Application No. 62/629,885 filed Feb. 13, 2018, the entirety of which is incorporated by reference.

STATEMENT REGARDING FEDERALLY SPONSORED RESEARCH OR DEVELOPMENT

This invention was made with government support under Contract No. NNX17CM34P awarded by NASA SBIR. The government has certain rights in the invention.

BACKGROUND

Embodiments relate to manufacturing a component with both additive manufacturing and subtractive manufacturing and, more particularly, to a system and method to manufacture within an enclosure where a part is created with both additive manufacturing and subtractive manufacturing where build tolerances for the part are measured during and post processing.

A type of manufacturing that is growing in use and popularity is additive manufacturing. An existing type of manufacturing is subtractive manufacturing or where segments or chunks are moved from an initial bulk material to create a final part.

Limitations of additive manufacturing resolution have been known for decades. Others have attempted to address this in fused deposition modeling ("FDM") type processes by reducing a size of the nozzle opening, thereby shrinking the size of extruded material. This has been found to reduce layer heights and extrusion widths at the expense of increasing the time required to complete deposition. A further downside is an increase in a likelihood of encountering errors in printing such as clogging or skipping of extruder motor steps. As a result, post processing is likely necessary to finish a manufactured part. In such cases, separate steps utilizing different machines are employed for deposition, finishing and dimensional verification of parts.

Furthermore, conventional wisdom in additive manufacturing dictates that to increase resolution, a decrease in a cross-sectional area of deposited traces is required. This may result in significant problems in FDM processes including greatly increasing time to manufacture, and likelihood of errors occurring during the process. When printing metals, conventional wisdom follows a similar approach by seeking out high precision deposition techniques which utilize focused laser or electron beam energy sources to melt metal powders into small traces.

Also, conventional wisdom suggests that the use of large machines operated by skilled technicians that are dedicated to a single function is often best.

Manufacturing in reduced gravity or fluctuating gravity environments can be challenging. Additive manufacturing is a type of manufacturing that has been demonstrated by the Assign that works in a micro-gravity environment.

Where a bulk material is used to manufacture, the part being created is either manually rotated to expose a specific part of the bulk material to the machining hardware or in a manual way or the degree of freedom of the manufacturing hardware and the bulk material are arranged in such a way that rotation is not required. However, these described actions work best in the presence of gravity which aides in the action.

Manufacturers would benefit from a system and method where a single machine may be used to provide acceptable specification tolerances of a part that is manufactured where the part may be rotated and repositioned without human participation in a reduced gravity environment. This would be particularly beneficial where a manufacturing area is limited, such as on a space station, in outer space or on a celestial body.

SUMMARY

Embodiments relate to a system and method to enable additive manufacturing deposition and subtractive manufacturing processing where manipulation of a part being created is possible. The system comprises a robotic arm movable about a rotational axis to at least one of move and reposition a part at least one of during part creation and after part creation in a micro-gravity environment, wherein creation is performed by at least one of a polymer-based additive manufacturing subsystem and a metallic-based additive manufacturing subsystem. The system also comprises a gripping device attached to the robotic arm which holds the part during at least one of part creation and after part creation.

The method comprises providing a robotic arm, within a build area in a micro-gravity environment where creation of a part is performed by at least one of a polymer-based additive manufacturing subsystem and a metallic-based additive manufacturing subsystem, wherein the robotic arm is movable about a rotational axis to at least one of move and reposition the part at least one of during part creation and after part creation. The method also comprises engaging and disengaging the robotic arm from the part with a gripping device attached to the robotic arm.

Another system comprises a build area, located in a micro-gravity environment, to create a part with at least one of a polymer-based additive manufacturing subsystem and a metallic-based additive manufacturing subsystem. This system also comprises a robotic arm with at least a first end fixed within the build area and a second end movable about a rotational axis to at least one of move and reposition a part at least one of during part creation and after part creation. The system also provides for a gripping device attached to the robotic arm which holds the part during at least one of part creation and after part creation.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

DETAILED DESCRIPTION

Figure 1:
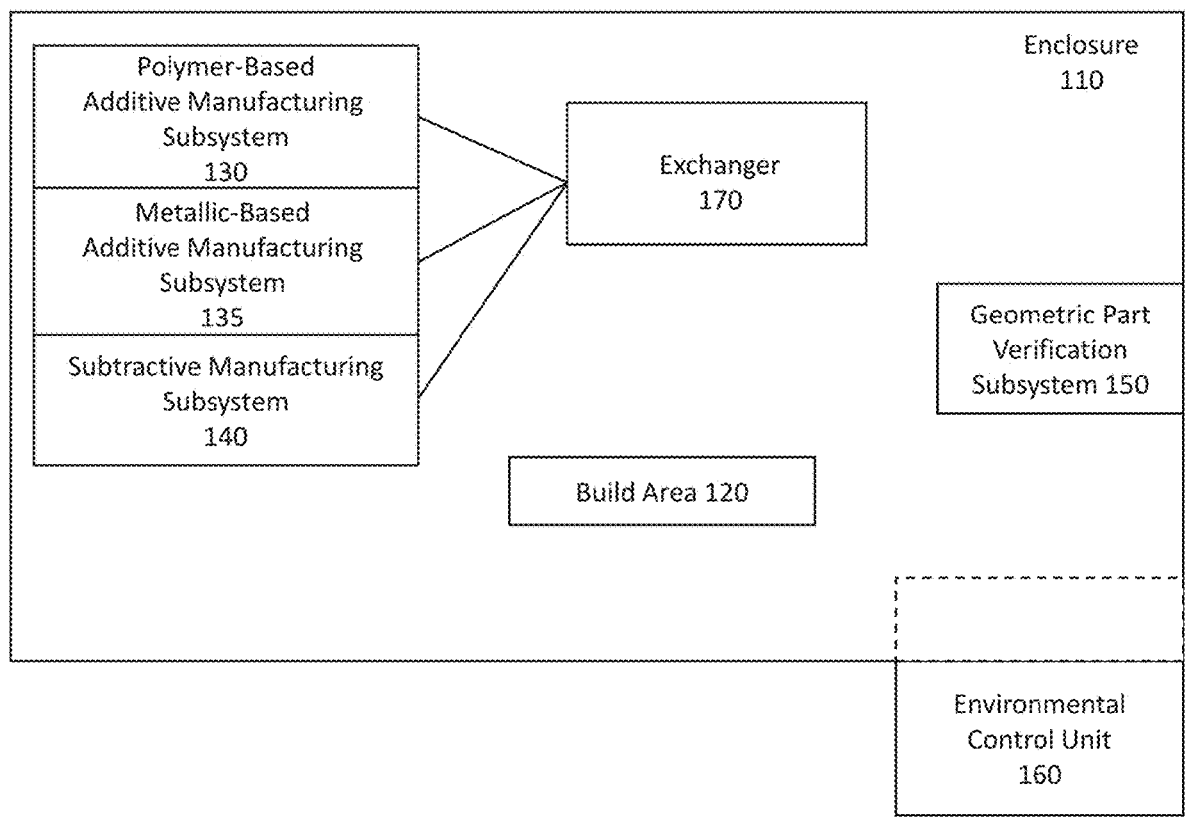
FIG. 1 shows a block diagram of an embodiment of components of a hybrid additive and subtractive manufacturing system.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Embodiments disclosed herein provide for an additive and subtractive metal and plastic manufacturing system incorporating metal deposition, thermoplastic deposition, computer numeric control (CNC) machining capabilities, environmental control, and part geometry verification. The embodiments may perform any one of ready to use print depositions, prints that are machined entirely post deposition, prints with deposition and machining iterations, and stand-alone machining operations. As is further disclosed herein, debris present from manufacturing operations may be captured in an environmental control unit designed to trap particulates produced within the build volume. The debris may be contained for safe system operation, such as, but not limited to an environmental control system and method disclosed in U.S. Provisional patent Application No. 62/591,240 or U.S. patent application Ser. No. 16/202,606, incorporated herein by reference.

Once or during part construction or manufacturing, a geometric part verification system may confirm part geometry. In another embodiment the geometric part verification system may determine a defect in the part and build a corrective manufacturing action to amend errors. The embodiments shown herein may be scalable and adaptable. Also, as discussed later herein, the term geometric is not included to be limiting as verification beyond geometrics of a part may be performed.

FIG. 1 shows a block diagram of an embodiment of the system described above. The system 100 may include an enclosure 110. Within the enclosure is a build area 120. A polymer-based additive manufacturing subsystem 130 and a metallic-based additive manufacturing subsystem 135 are also disclosed. A subtractive manufacturing subsystem 140 is also shown. A geometric part verification subsystem 150 is provided. Though the term "geometric" is included, as disclosed herein, this term is not meant to be limiting since the part verification subsystem 150 can verify other characteristics besides geometric features such as, but not limited to, material composition, internal part structure, etc.

An environmental control unit 160 is also shown. An exchanger 170 is shown which may switch between whether polymer-based additive manufacturing processing or metallic-based additive manufacturing processing is being performed. The switch may be exchanging deposition heads. Furthermore, the switch may include placement of a tool for use with a subtractive manufacturing process.

Figure 2:
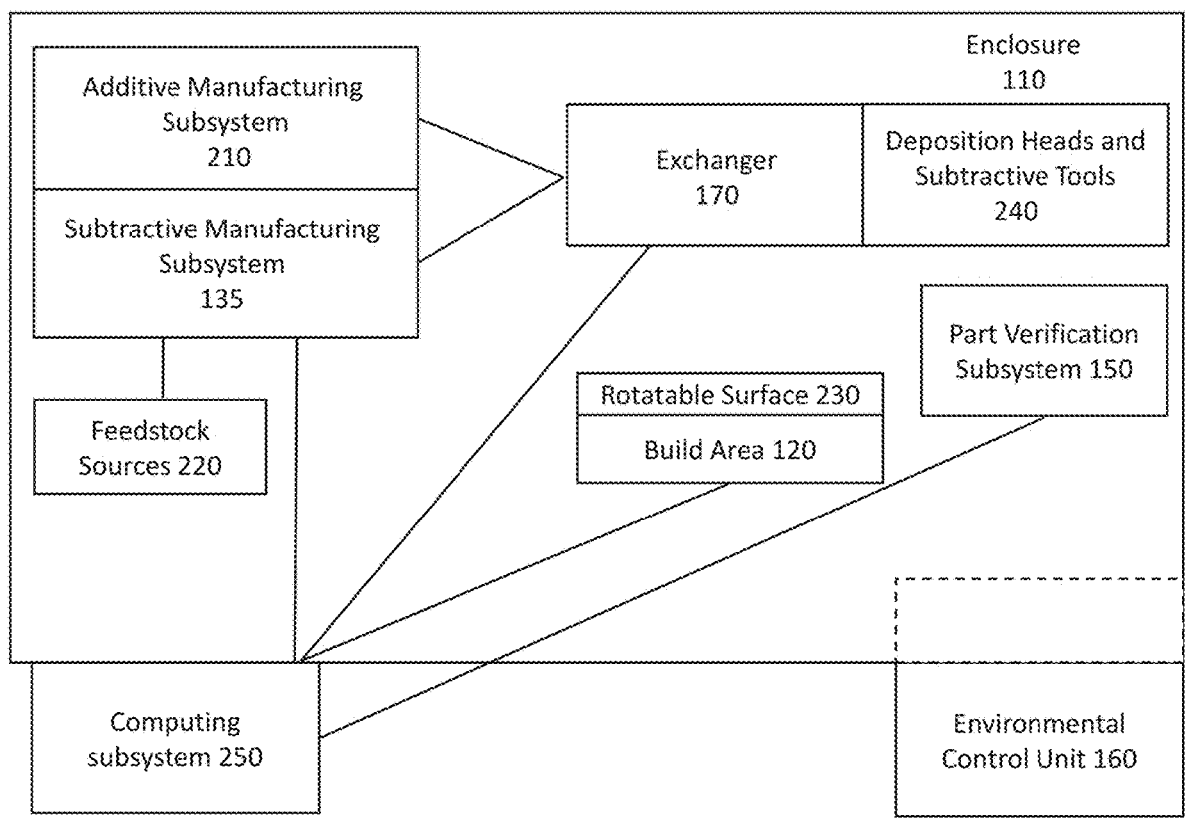
FIG. 2 shows another block diagram of the system.

FIG. 2 shows another block diagram of an embodiment of the system. An additive manufacturing subsystem 210 is shown. The additive manufacturing subsystem 210 may comprise both the polymer-based additive manufacturing subsystem 130 and metallic-based additive manufacturing subsystem 135 discussed herein. Feedstock sources 220 such as, but not limited to, a plurality of bins may also be provided which may be used to store the feedstock specific for use by either the polymer-based additive manufacturing subsystem 130 or the metallic-based additive manufacturing subsystem 135. Also shown is a rotatable surface 230. Also shown is a holder 240 to locate deposition heads and/or subtractive tools prior to use. As explained later herein, a computing device, or subsystem, 250 is shown.

Figure 3:
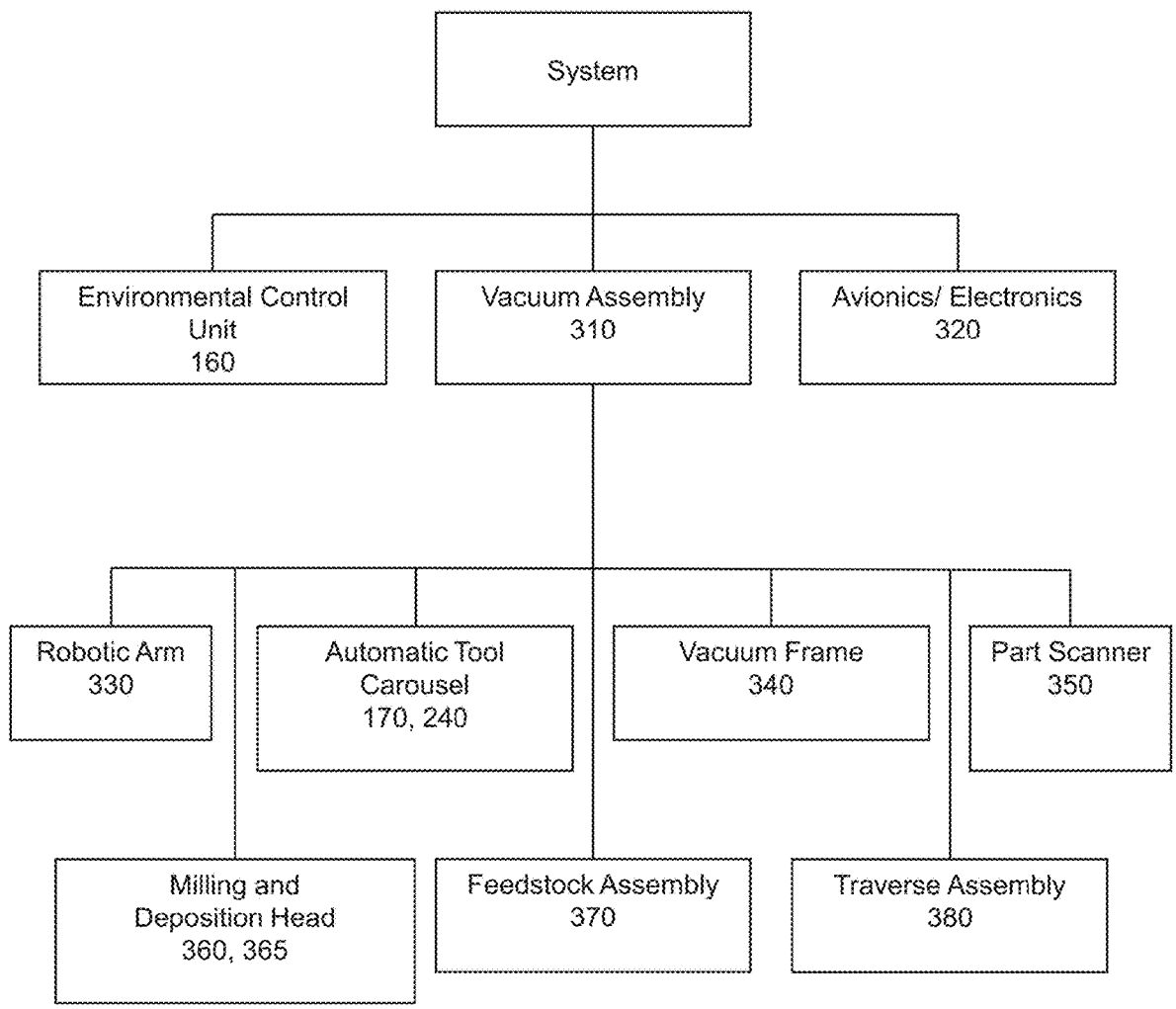
FIG. 3 shows another block diagram of the system.

FIG. 3 shows a block diagram of an embodiment of components of a hybrid additive and subtractive manufacturing system. As shown, the system 100 may comprise the environmental control unit 160 such as, but not limited to, a unit as disclosed above and incorporated herein by reference. A vacuum assembly 310 may also be provided to remove debris or particulates or particles resulting from a manufacturing process. Avionics/electronic components 320 may be provided to further operate the system 100. The avionics/electronic components 320 may also comprise the computing device 250 disclosed herein. The system 100 may further comprise a robotic arm 330 to at least engage a part being made. The tool carousel 240, which may be automatic, as controlled by the computing device, may be provided to house or hold and exchange deposition heads. In another embodiment, the exchanger 170 is provided to exchange deposition heads or tools. A vacuum frame 340 may also be provided. The geometric part verification subsystem 150 may comprise a scanner 350 which may be provided to capture images of a physical object for use in determining whether the part adheres to a desired specification. The desired specification may be a geometric specification or requirement or manufacturing component consistency of the part.

The scanner 350, or imager, or imaging scanner, may perform this function during manufacturing or once manufacturing is complete. In an embodiment, images may be captured as the rotary bed or surface 230 moves or rotates so that all angles or sides of the part may be captured to ensure a precise adherence to the desired specification. Therefore, though the term rotatable surface is used herein, this surface may move in transverse direction, circular direction, elliptical direction, etc. The movement is not limited to a particular pattern. The scanner 350 may image an outside surface of the part or may also operate at a wavelength such as, but not limited to, a wavelength used for x-ray scans, to image an inside surface or content of the part.

Milling tools 360 and deposition tools 265, or heads are disclosed. The at least one milling tool 360 may be provided to remove a piece from the part during an subtractive manufacturing process. A feedstock assembly 370 is provided to supply deposition feedstock. The feedstock is specific to the type of additive manufacturing process being performed such as, but not limited to, polymer-based additive manufacturing and metallic-based additive manufacturing. The feedstock assembly 370 may be able to switch between the types of feedstock required based on the additive manufacturing process or multiple feedstock assemblies 370 being provided specific to each type of additive manufacturing process. The exchanger is provided to place to move the deposition heads to desired locations. The exchanger 170 may be a traverse assembly 380. The traverse assembly 380 may also be used to rotate the rotary or traverse the rotatable surface or bed 230.

Figure 4:
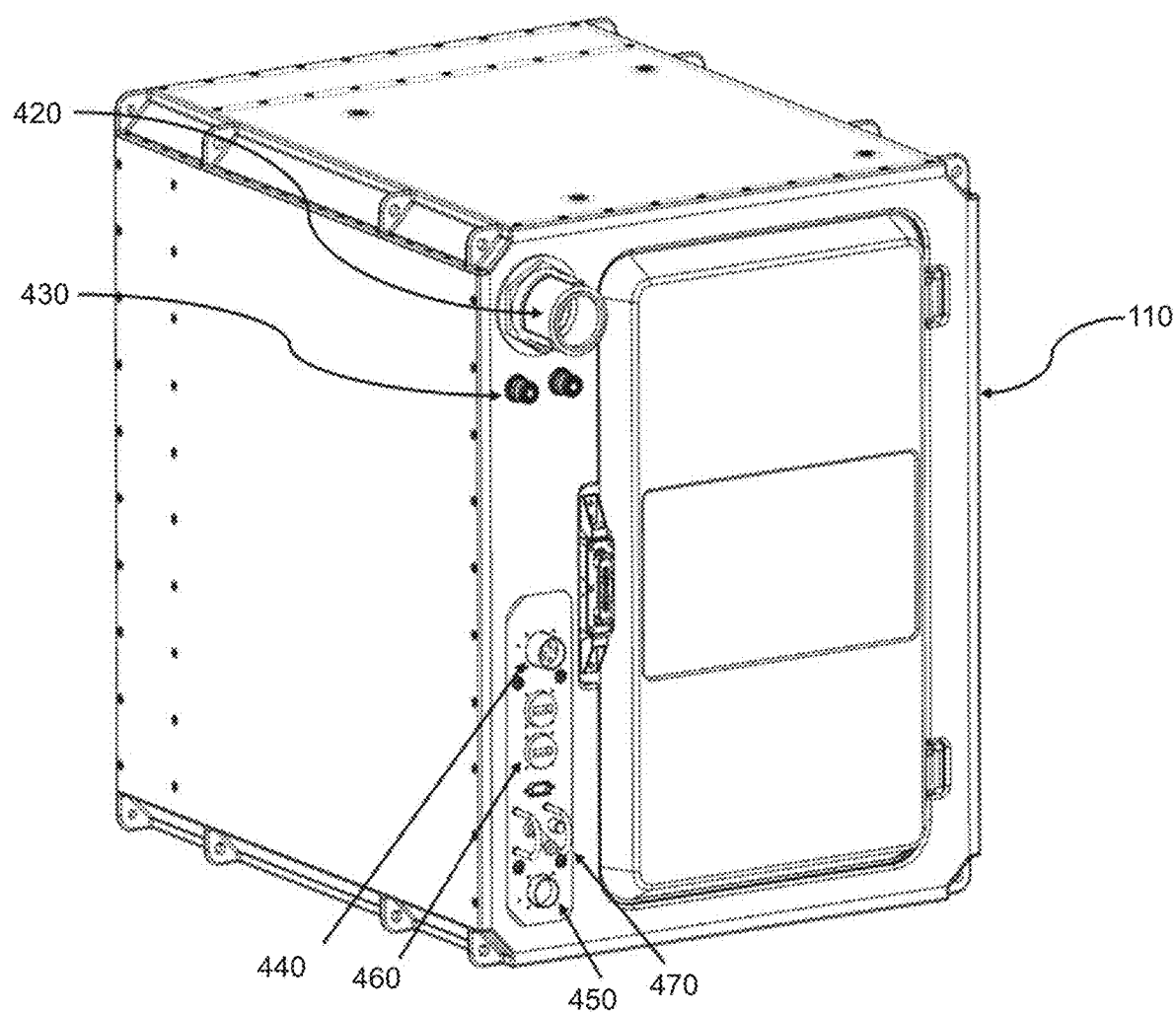
FIG. 4 shows an embodiment of the system as an operational unit.

FIGS. 4-12 show embodiments of various aspects of the system. FIG. 4 shows an embodiment of the system 100 as an operational unit. As shown, the enclosure 110 is provided.

The enclosure 110 may comprise a door 410, which is shown as closed. During operation of the system 100, the door 410 is likely to be closed. An exhaust port 420 may be provided to connect to the environmental control unit 160. The environmental control unit 160 may comprise the vacuum assembly 310, including the vacuum frame 340. The vacuum assembly 310 may be within the enclosure or outside the enclosure 110. Water lines 420 may be provided to supply and remove water from within the enclosure 110.

A second port 440 may be provided to provide power to the system 100. The power may be a plurality of different power sources to produce different types of power such as, but not limited to, direct current, alternating current, beamed power, or from an energy storage system such as a fuel cell or battery. The type of power may be specific to the type of additive manufacturing or subtractive manufacturing being performed. As a non-limiting example, during a metallic-based additive manufacturing process a laser may be used which may require a more powerful power source than when applying the a polymer-based additive manufacturing process.

Figure 21:
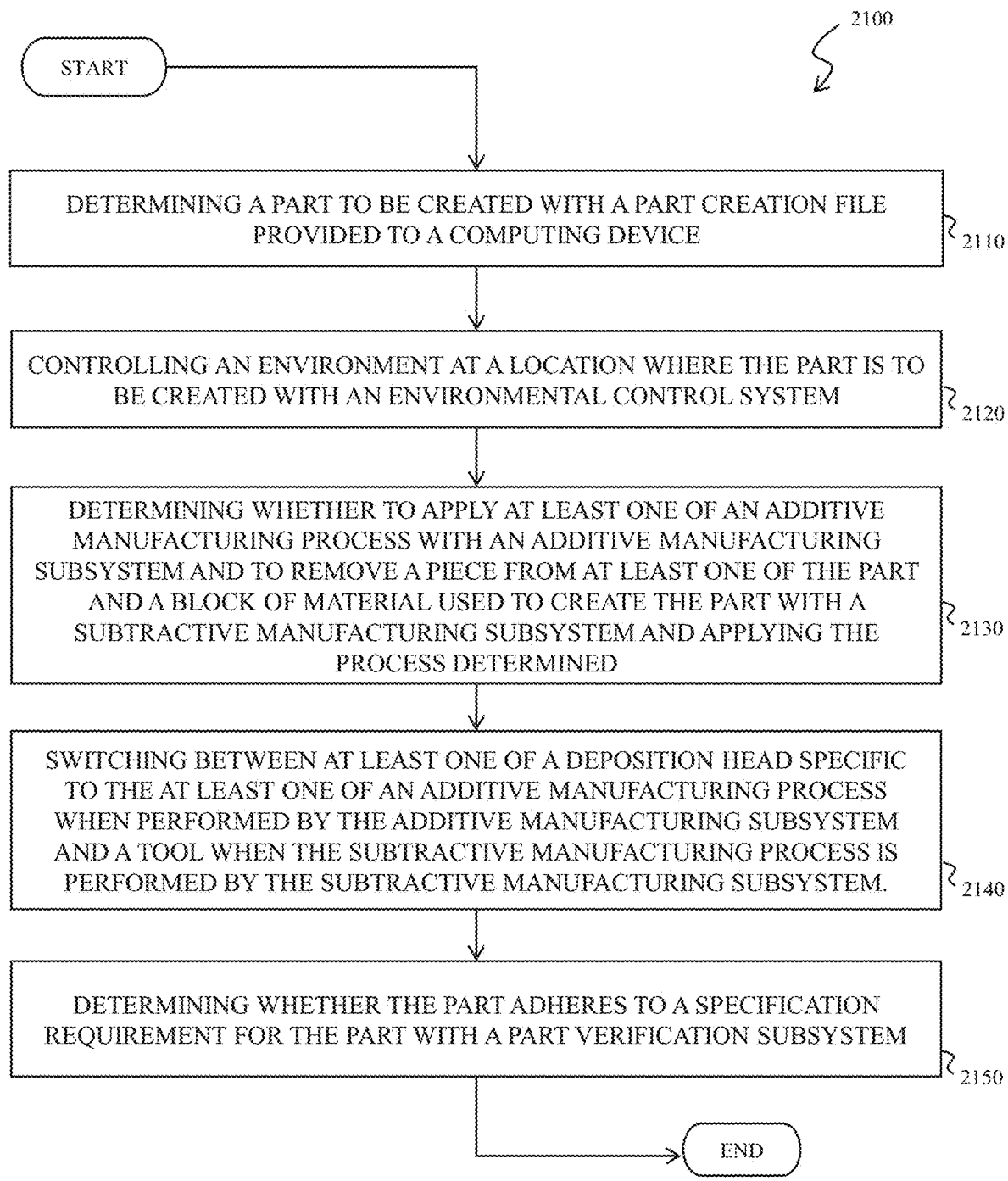
FIG. 21 shows another flowchart of an embodiment of a method.

At least one data port 450 may be provided to attach an electronic storage device, not shown, but may be part of the computing device 250 shown in FIG. 21. Another type of data port 460 may also be provided such as, but not limited to, a USB port. An electric breaker 470 may also be provided. The manufacturing atmosphere within the enclosure 110 may be composed of ambient constituents such as, but not limited to, inert gasses, or even a vacuum.

Figure 5:
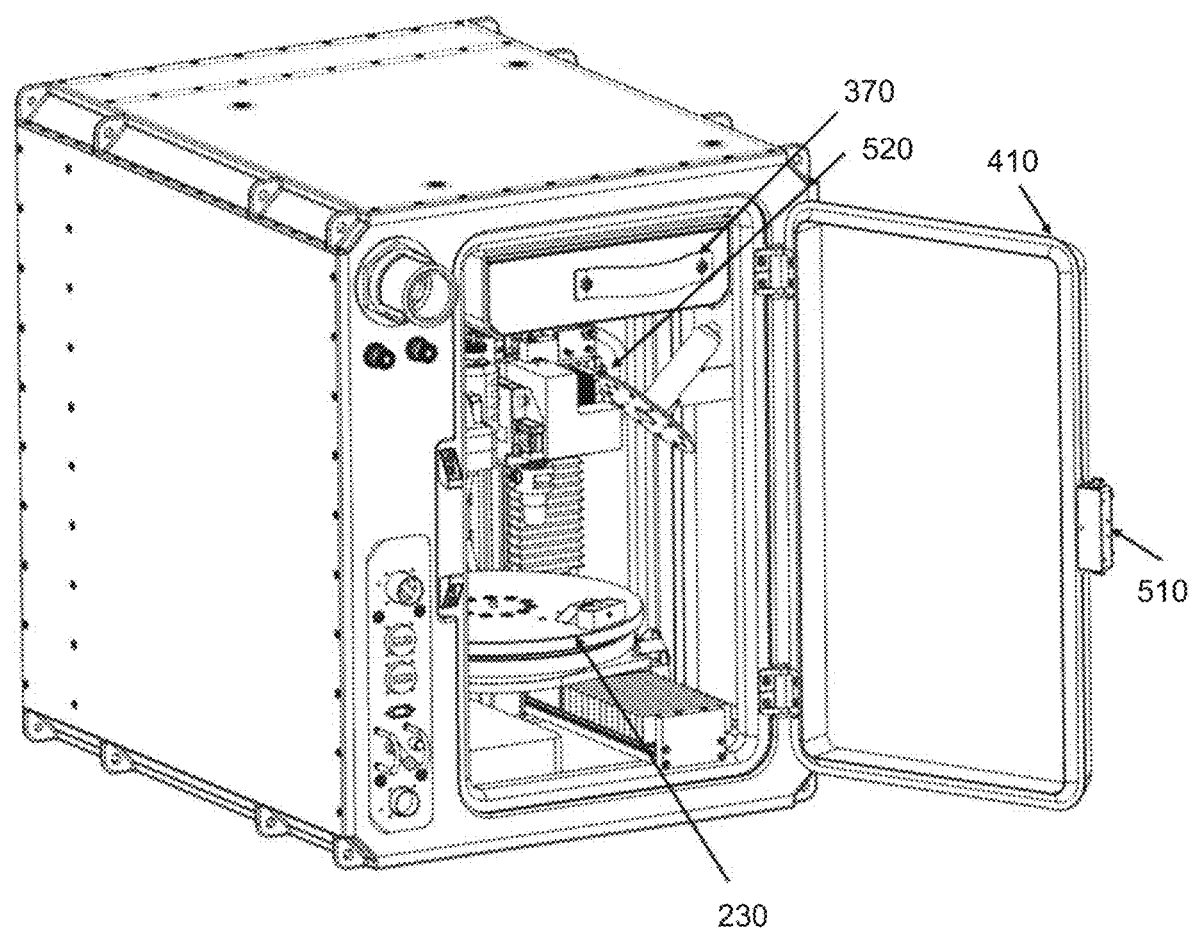
FIG. 5 shows an embodiment of the system with the door open.

FIG. 5 shows an embodiment of the system with the door open. Viewing within the opening that is covered by the door 410 is a rotary bed on which the part is created. The door 410 may have a latch 510 to secure the door 410 in place when the door is in a closed position. The build area 120, or bed, may be rotated as needed for part creation. As discussed above, the build area 120 may be moved any direction, in addition to being rotated. A traverse mechanism 520 is shown. The traverse mechanism 520 may be provided to locate the deposition heads and/or rotate the rotary bed 230 as needed during part creation. A feedstock canister, or assembly 370, to hold feedstock prior to deposition, is also shown.

Figure 6:
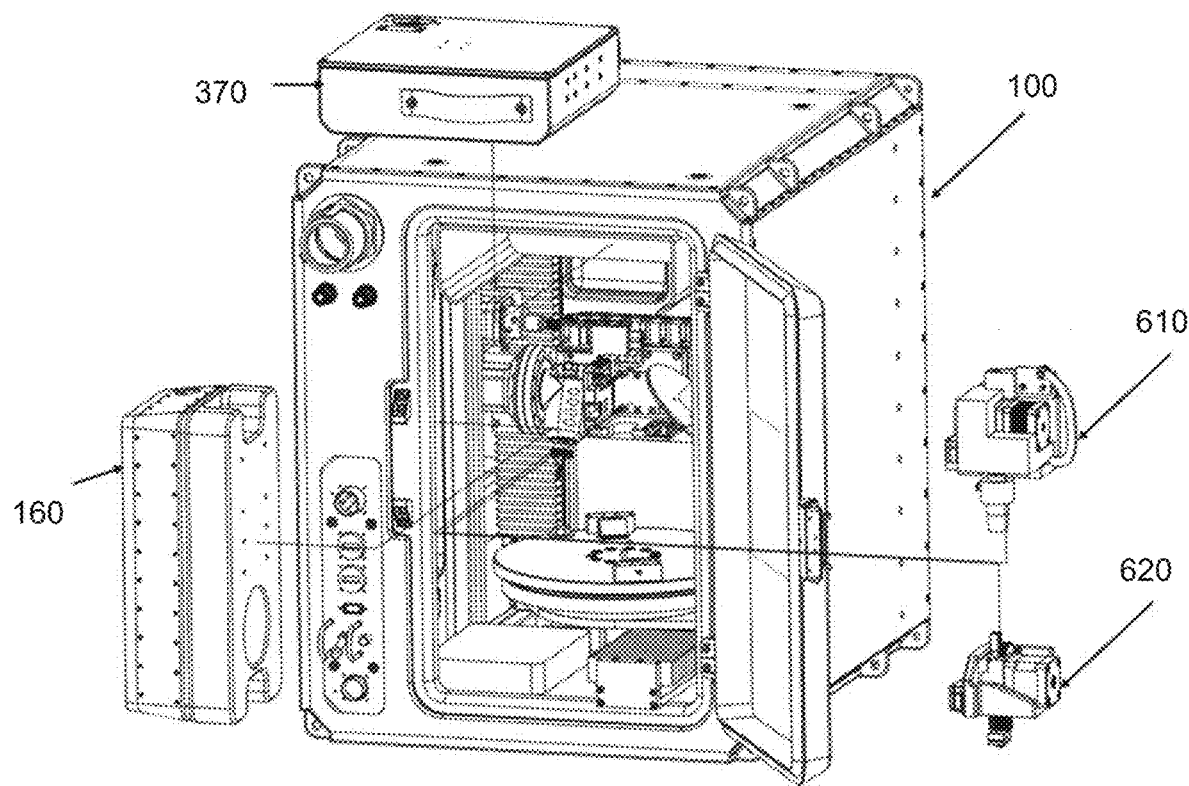
FIG. 6 shows an embodiment of the system with serviceable parts removed.

FIG. 6 shows an embodiment of the system with serviceable parts removed. As shown, the environmental control unit is removable. The feedstock canister 370 may also be removed. A metal deposition head 610 and a polymer deposition head 620 are shown and may also be removed.

Figure 7:
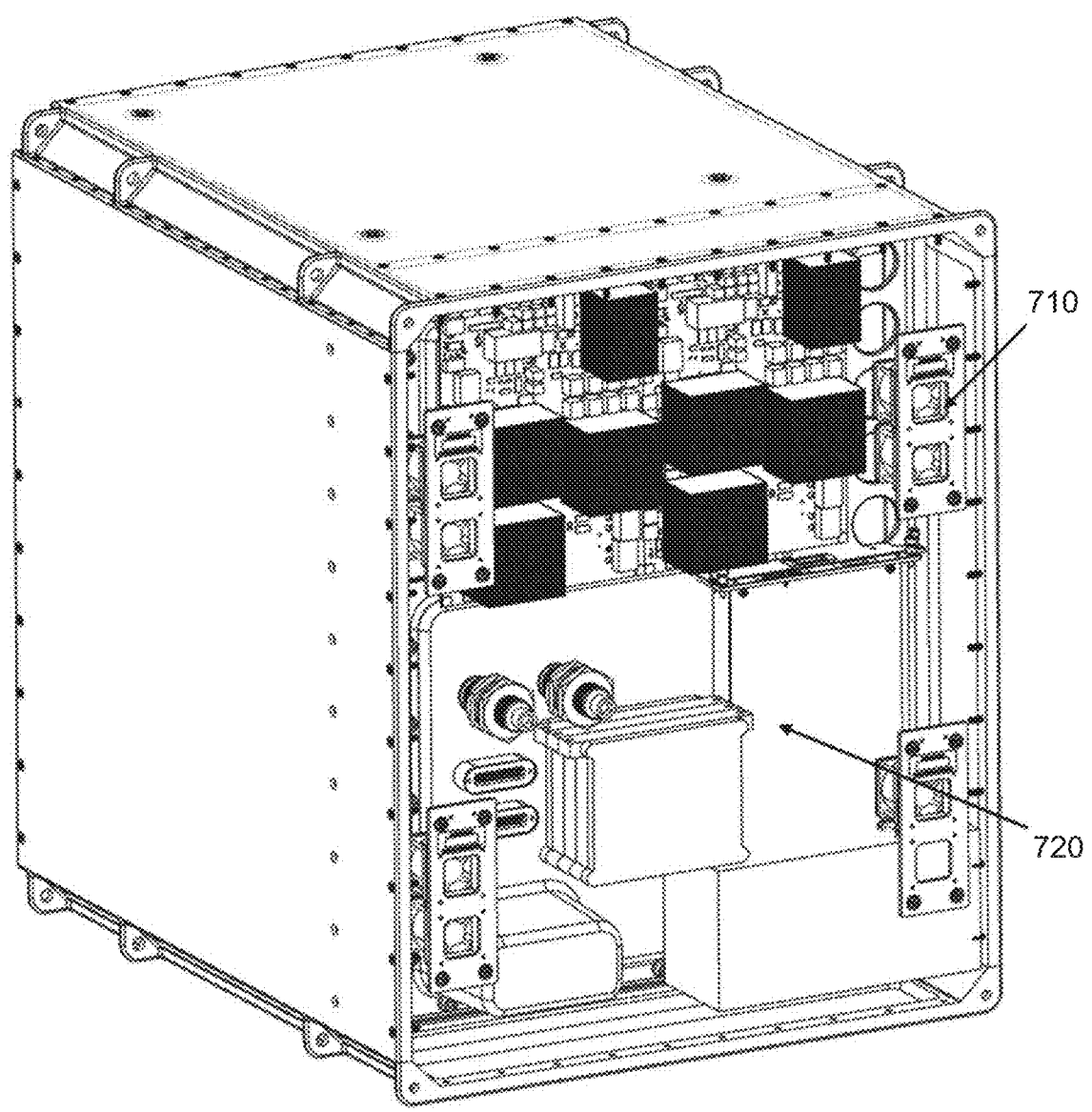
FIG. 7 shows an embodiment of a backside of the system.

FIG. 7 shows an embodiment of a backside of the system. As shown, at least one gas port 710 may be provided to supply a gas, such as air to the system 100. An electronic bay 720 is also disclosed. The electronic bay 720 may house the computing device 250 disclosed herein.

Figure 8:
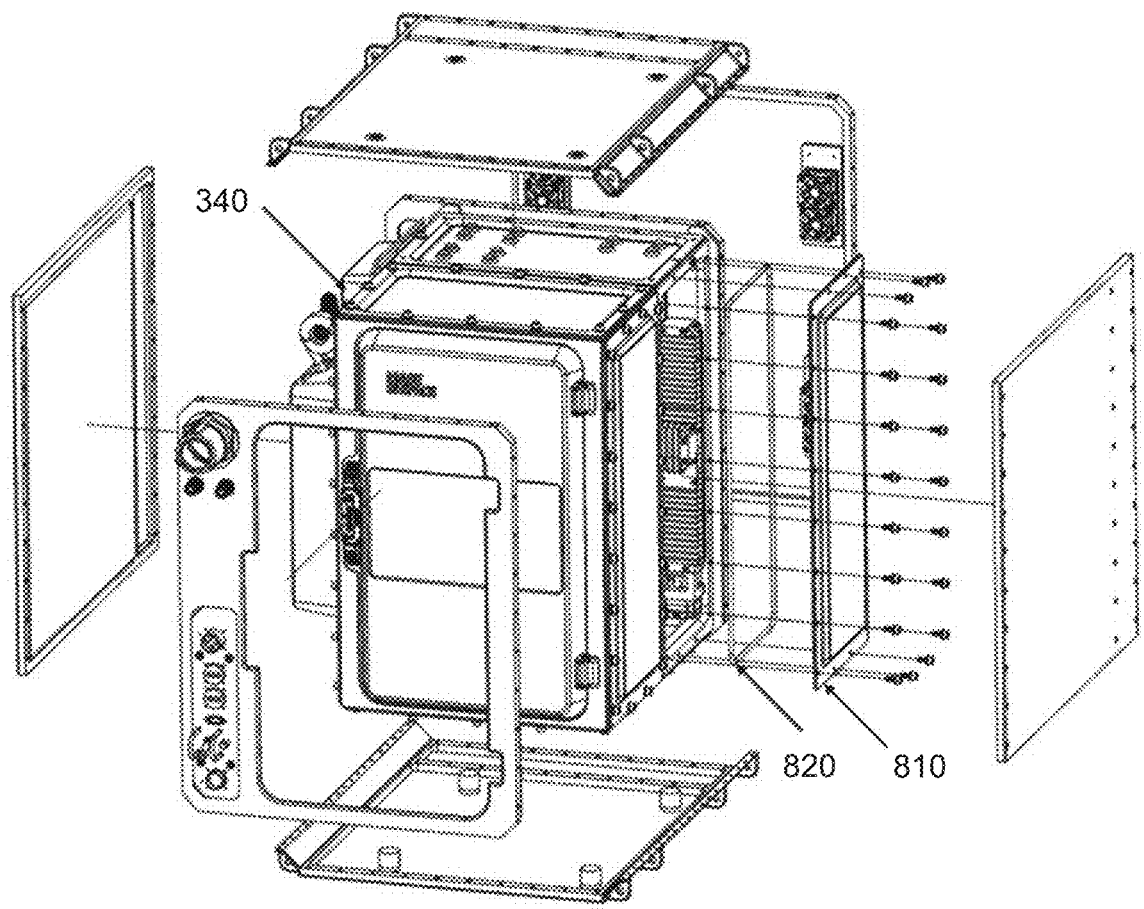
FIG. 8 shows an embodiment of the system with outer walls removed.

FIG. 8 shows an embodiment of the system with outer walls of the enclosure removed. As shown, the vacuum frame 340 is provided. A modular panel 810 is shown. A sealing O-ring 820 is shown to provide a seal for the modular panel 810 when attached within the enclosure 110 to provide for a sealed interior.

Figure 9:
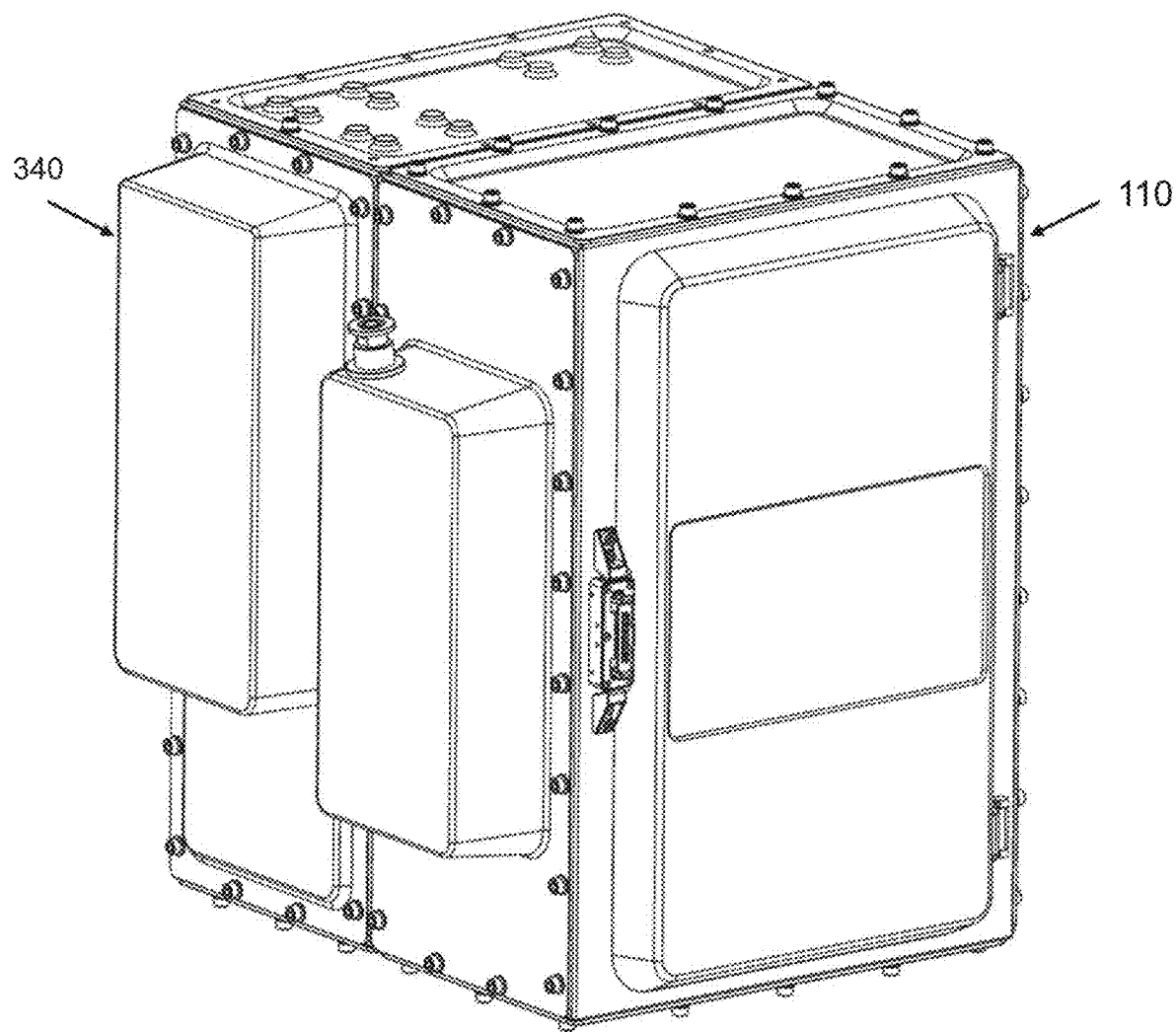
FIG. 9 shows an embodiment of the system fully enclosed.

FIG. 9 shows an embodiment of the system fully enclosed. A vacuum panel may be a part of the vacuum frame 340.

Figure 10:
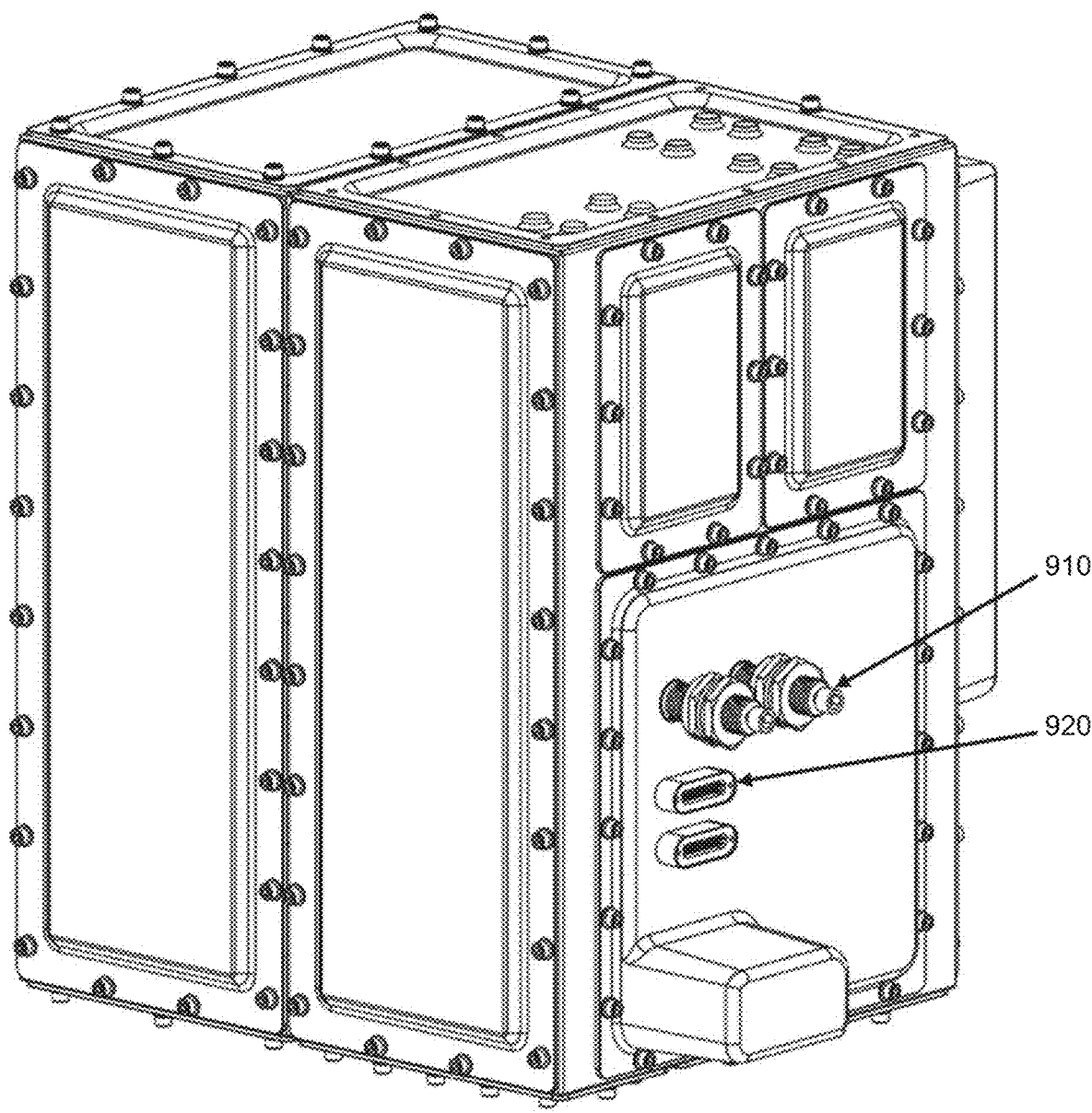
FIG. 10 shows an embodiment of another view of the system fully enclosed.

FIG. 10 shows an embodiment of another view of the system fully with the outer walls removed. Power feedthroughs 910 are shown along with instrumentation feedthroughs 920.

Figure 11:
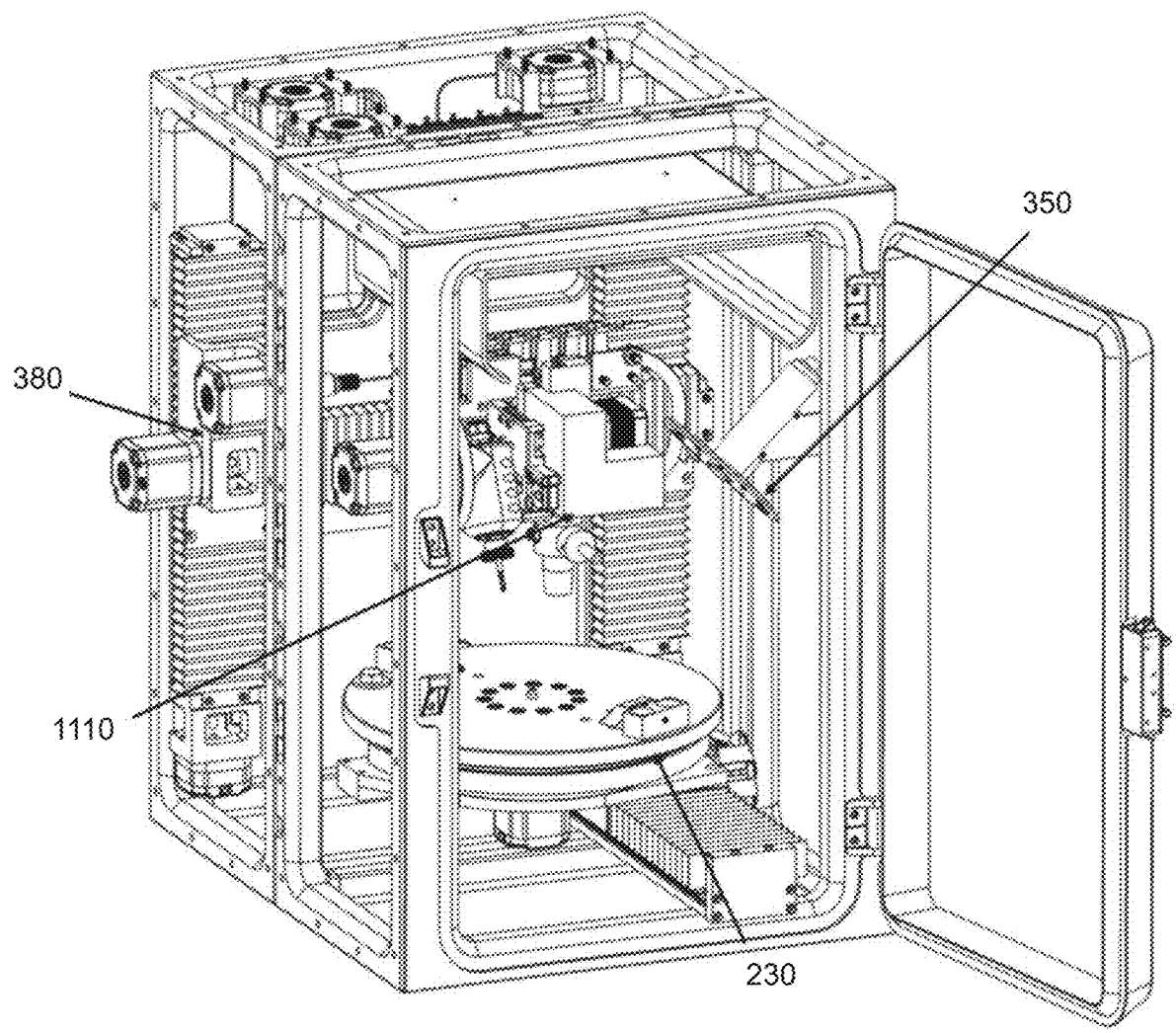
FIG. 11 shows an embodiment of the system with the sides removed.

FIG. 11 shows an embodiment of the system with the sides removed. As shown, a part scanner 350 is shown. Also shown is the traverse system 380 and the rotary bed 230. A milling and deposition assembly 1110 are also disclosed. This assembly 1110 may be what holds the deposition heads or tools based on the type of manufacturing process being used.

Figure 12:
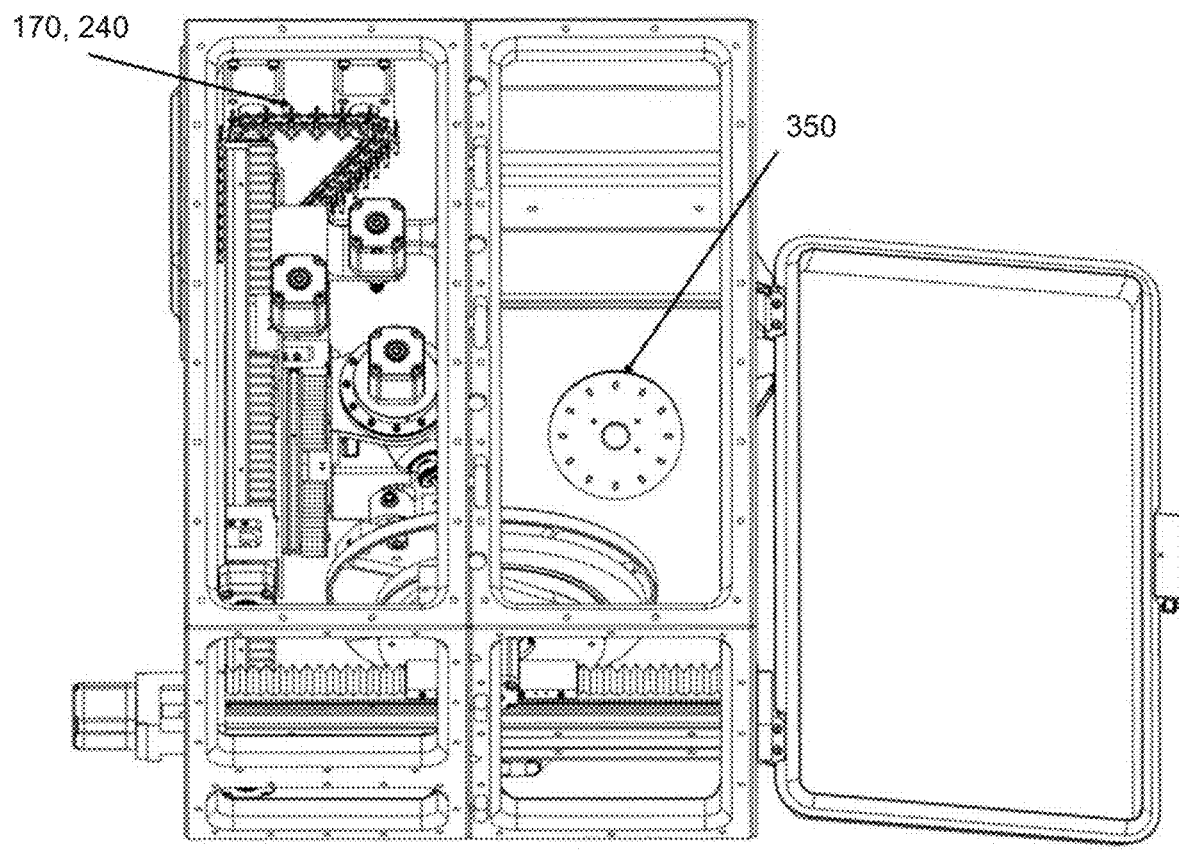
FIG. 12 shows an embodiment of a side view of the system with the sides removed.

FIG. 12 shows an embodiment of a side view of the system with the sides removed. As shown the scanner is visible along with the tool carousel 170, 240.

Figure 13:
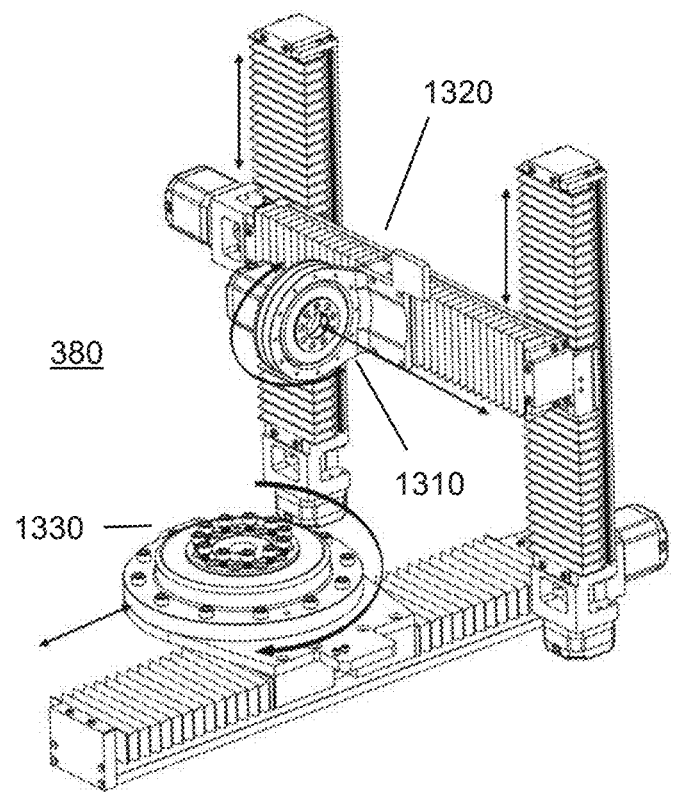
FIG. 13 shows an embodiment of the traverse system removed from the system.

FIG. 13 shows an embodiment of the traverse system removed from the system. As shown, a first attachment component 1310 is arranged to move left to right. A horizontal traverse bracket 1320 is arranged to move up and down or vertically. The first attachment 1310 is attached to the horizontal traverse bracket 1320. Another, or second attachment component 1330 to which the rotary table 230 may be attached is also provided. The traverse system 380 may also be arranged to move the rotary table 230 front and back (forward and backward) in addition to circular about a center radius of the table 230.

Figure 14:
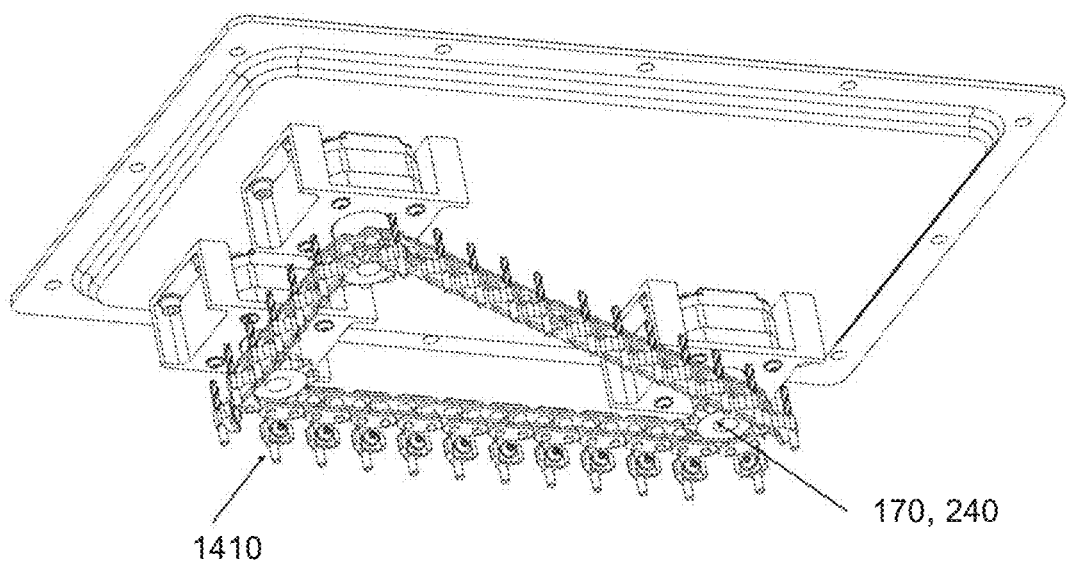
FIG. 14 shows an embodiment of the tool carousel.

FIG. 14 shows an embodiment of the tool carousel. The tool carousel 170, 240 may have attachments to hold at least one computer numerical control ("CNC") tool 1410 which may include at least one of metal deposition head 610, polymer deposition head 620, a welding head, a milling device, etc.

Figure 15:
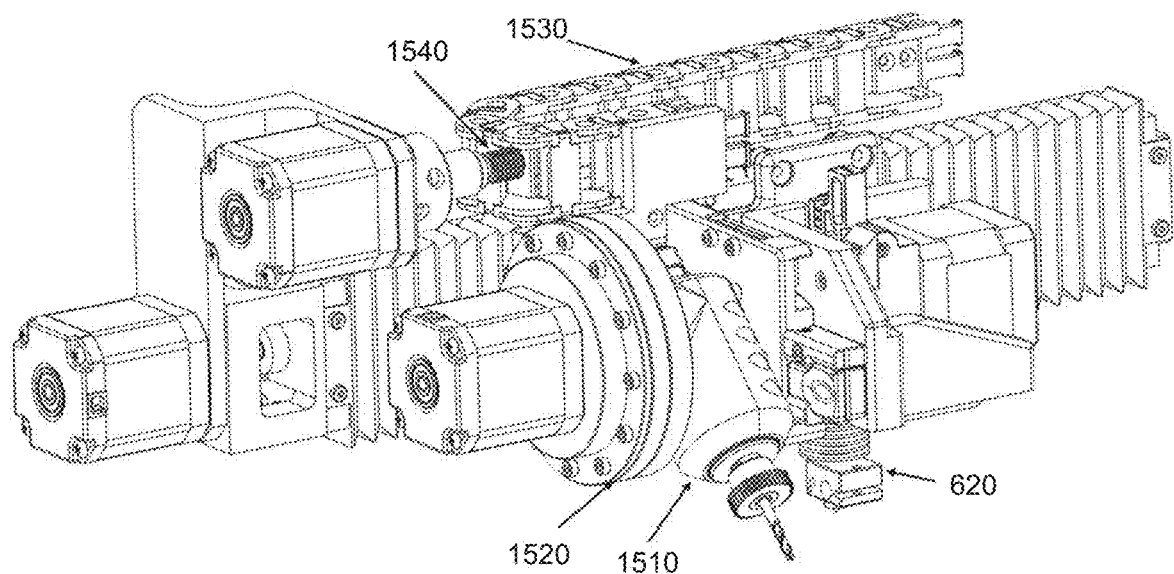
FIG. 15 shows the head assembly attached to a horizontal part of the traverse system.
Figure 16:
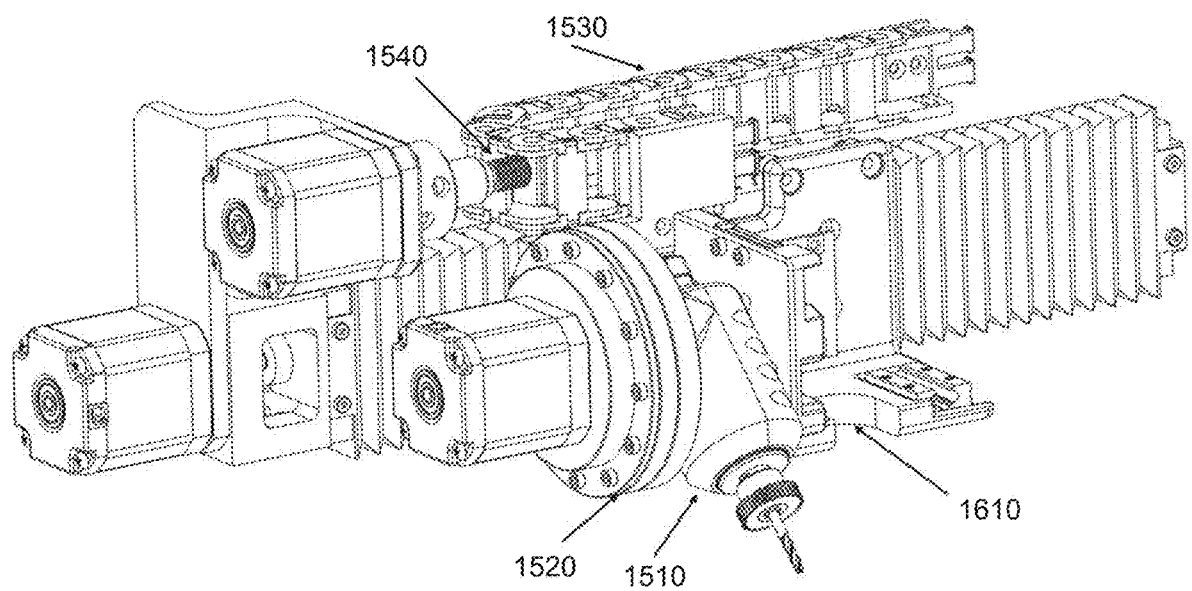
FIG. 16 shows another embodiment of the milling and head assembly.
Figure 17:
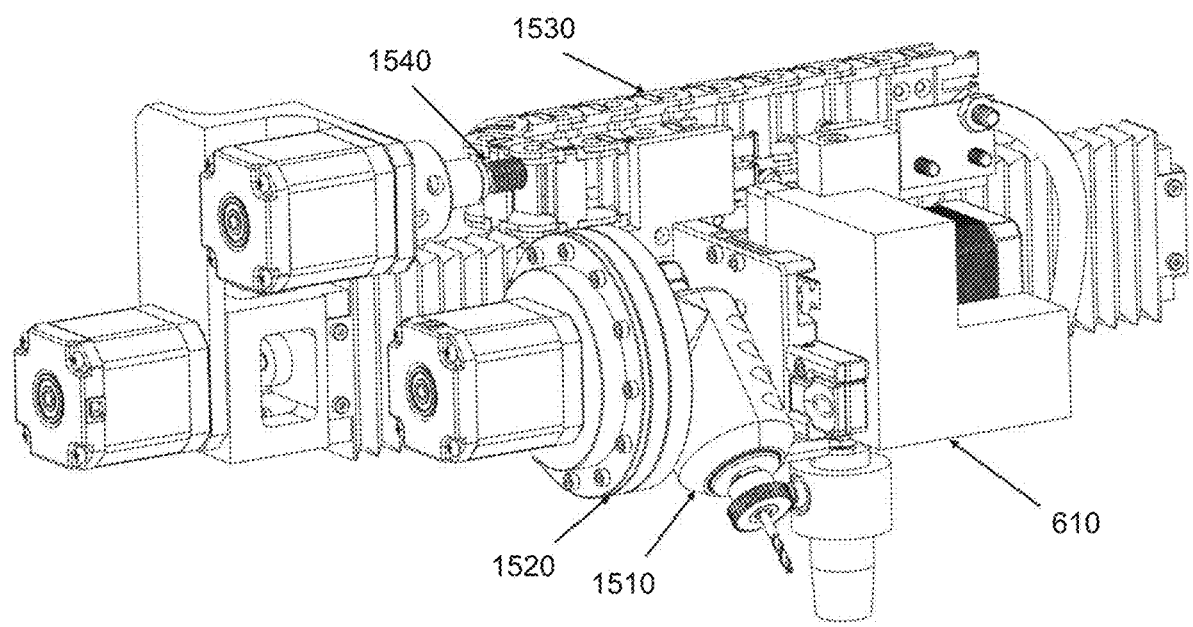
FIG. 17 shows another embodiment of the milling and head assembly.

FIGS. 15-17 show various embodiments of a milling and head assembly. In FIG. 15 the head assembly 360, 365 may be attached to a horizontal part of the traverse system 380. The milling and head assembly may have any of a polymer deposition head, metal deposition head, a milling tool, a welding head, etc. A milling spindle 1510 is shown. A strain-wave gear reducer 1520 is also disclosed. A device 1530 to move the head assembly and associated components is provided. The device may be belt driven, linear rail driven, or set up in a delta or polar (one or more components rotate) coordinate fashion. In one embodiment, it may be a drag chain. A collet compressor 1540 is also shown. Adjacent to the milling spindle 1510 is shown the polymer deposition head 620.

FIG. 16 shows another embodiment of the milling and head assembly. A deposition head is not installed in this embodiment. An additive head dock 1610 is shown instead, which is where the deposition head 610, 620 may be attached. Depending on the type of deposition, the deposition head 610, 620 is attached at the dock 1610.

To illustrate, remarks made above regarding FIG. 16, FIG. 17 shows another embodiment of the milling and head assembly. As shown, a metal deposition device 610 is disclosed where the polymer deposition head is provided in FIG. 15.

Figure 18:
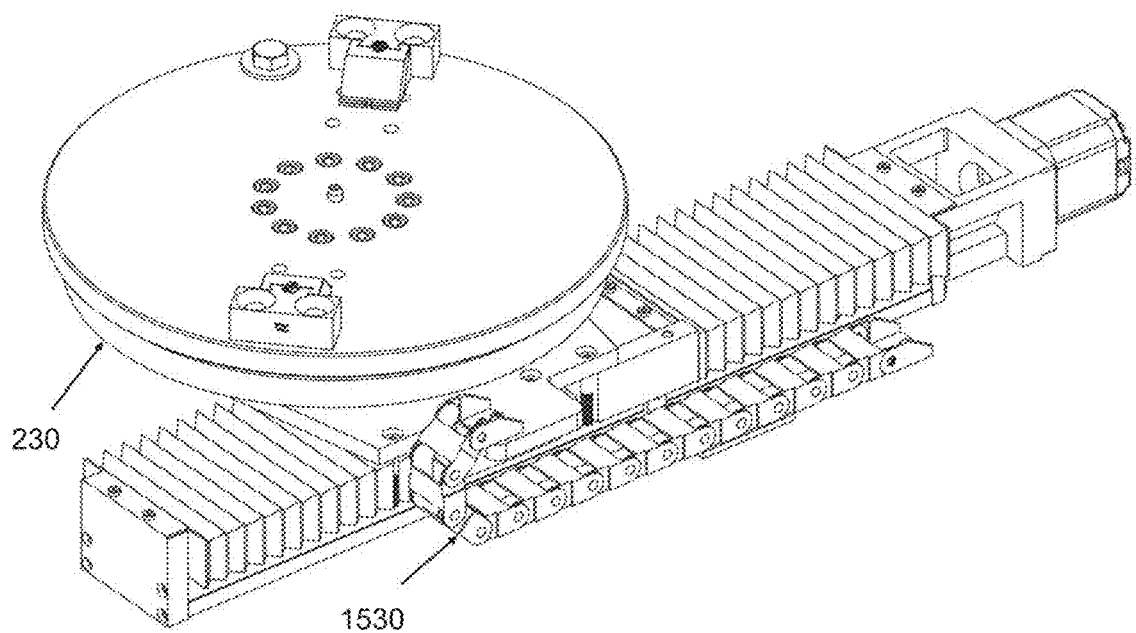
FIG. 18 shows the part of the traverse system to which the rotary bed is attached.

FIG. 18 shows the part of the traverse system to which the rotary bed is attached. As shown, a traverse bracket 1810 upon which the rotary bed 230 is attached. The device 1530 to move the bed 230 is also provided. As discussed above, the device 1530 may be a drag chain.

Figure 19:
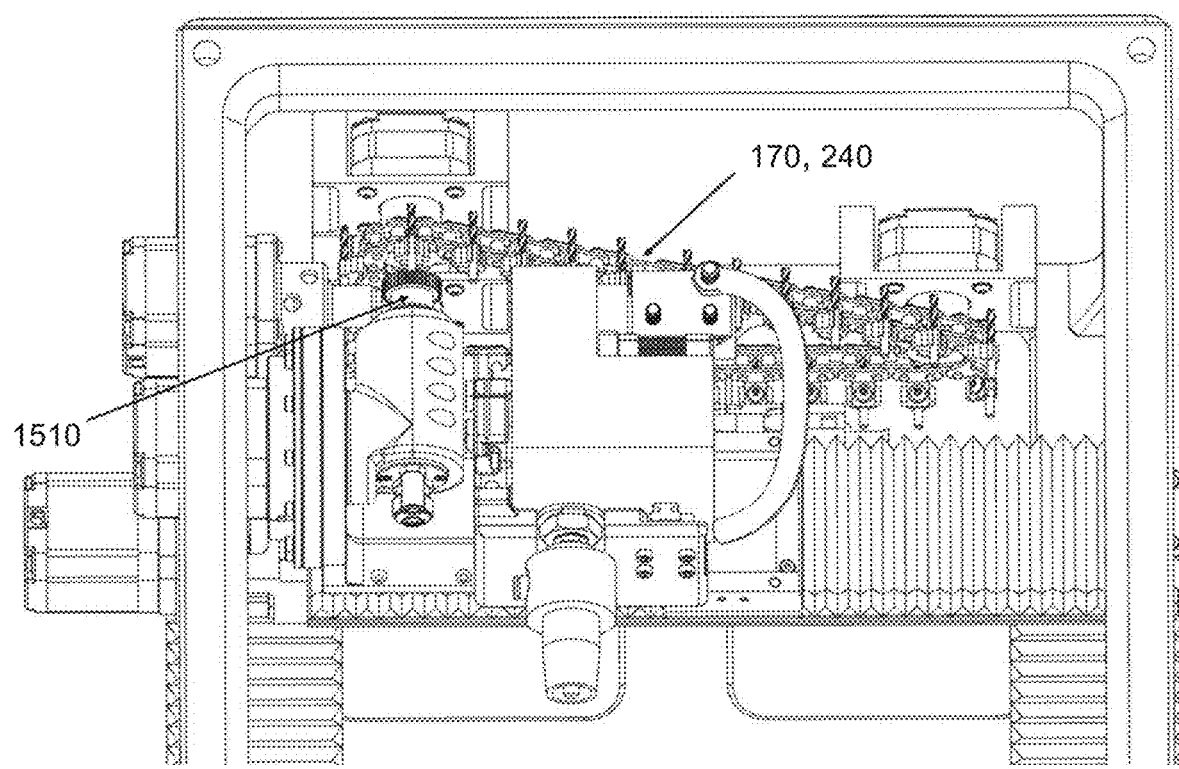
FIG. 19 shows an embodiment of a tool being changed.

FIG. 19 shows an embodiment of a tool being changed. As shown, the automatic tool carousel 170, 240 is disclosed. A machining spindle 1510 is shown where a part of the spindle fits within the tool holder 240 on the tool carousel 170.

Multiple subtractive manufacturing tools may be utilized in the embodiments disclosed herein. These tools may include, but are not limited to, milling, tapping, and routing bits, etc. Bits may be held on a chain driven selector, however, a rack can be used to store and select bits. Additionally, a traditional carousel changer or rigid straight line changer can be used.

Figure 20:
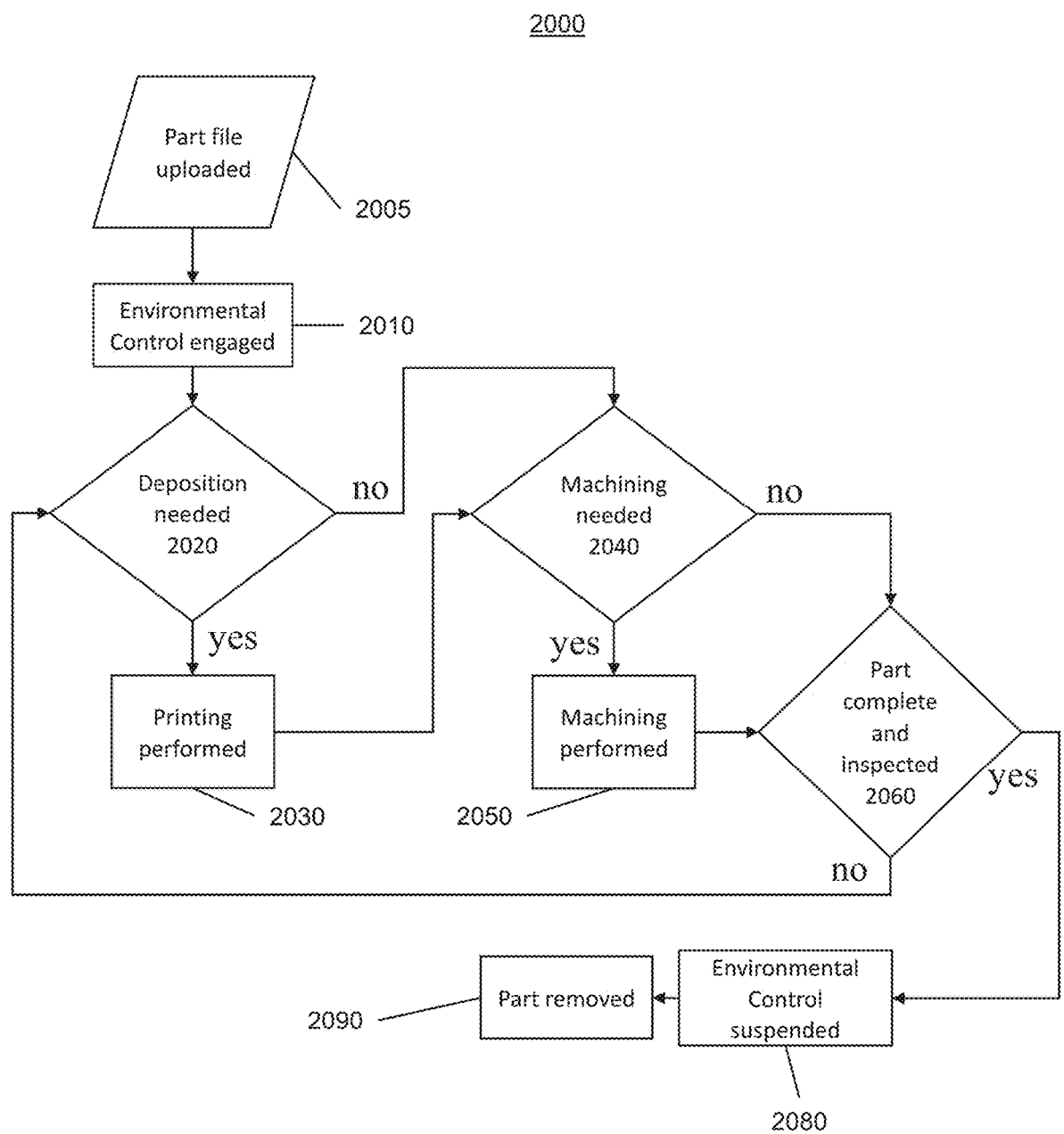
FIG. 20 shows a flowchart of an embodiment of a method.

FIG. 20 shows a flowchart of an embodiment of a method. A part file may be uploaded to the computing device 250. The method 2000 comprises activating the environmental control unit, at 2010. A determination whether a manufacturing deposition process is needed is made, at 2020. If the answer is yes, the additive manufacturing process is initiated, at 2030. If the answer is no, a determination whether machining of the part is needed, at 2040. If the answer is yes, the machining is performed, at 2050. Once the additive manufacturing processing is complete, and if the answer to machining is needed is no, at step 2040, the next determination is whether the part is complete and within the part specifications, at 2060.

If the part is not completed or if the specifications for the part are not met, the process begins again with first determining whether deposition is needed, at 2020. If the part is completed, the environmental control unit is turned off, at 2080, and the part is removed, at 2090. Removal may be performed manually or with the robotic arm 330.

Though a decision whether deposition is shown as occurring before determining whether to machine, these steps, and each's associated manufacturing steps may be interchanged. More specifically, determining whether machining is needed first and then performing the machining process, if needed, may occur prior to determining whether deposition is needed and performing the deposition process.

FIG. 21 shows another flowchart of an embodiment of a method. The method 2100 comprises determining a part to be created with a part creation file provided to a computing device, at 2110. The method 2100 may comprise controlling an environment at a location where the part is to be created with an environmental control system, at 2120. The method further comprises determining whether to apply at least one of an additive manufacturing process with an additive manufacturing subsystem and to remove a piece from at least one of the part and a block of material used to create the part with a subtractive manufacturing subsystem and applying the process determined, at 2130. The method further comprises switching between at least one of a deposition head specific to the at least one of an additive manufacturing process when performed by the additive manufacturing subsystem and a tool when the subtractive manufacturing process is performed by the subtractive manufacturing subsystem, at 2140. The method may further comprise determining whether the part adheres to a specification requirement for the part with a part verification subsystem, at 2150. This may be done either during or after the part is created. If after part creation, the part may be further modified, improved, as disclosed herein, until it is within the specification requirements.

Figure 22:
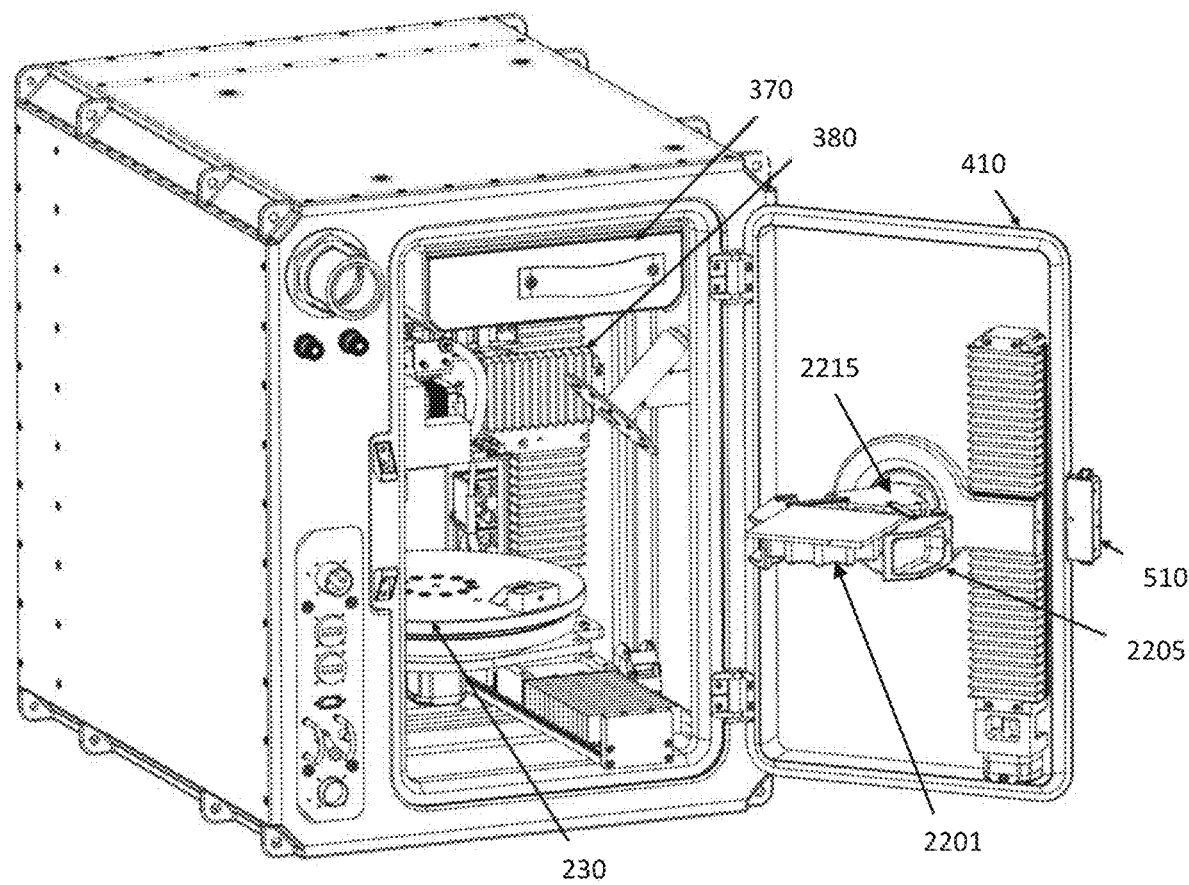
FIG. 22 shows an embodiment of the system with a robotic arm attached to an inner side of the door.

FIG. 22 shows an embodiment of the system with a robotic arm attached to an inner side of the door. A part 2201 is being held by a gripper 2205 of the robotic arm 2215. The gripper 2205 is available to move vertically with respect to the rotary bed 230. In operation, the part 2201 has been rotated one hundred and eighty degrees (180°) from the initial manufacturing state, as original located upon the rotary bed 230. The rotation angle can be between 0° and 360°.

Figure 23:
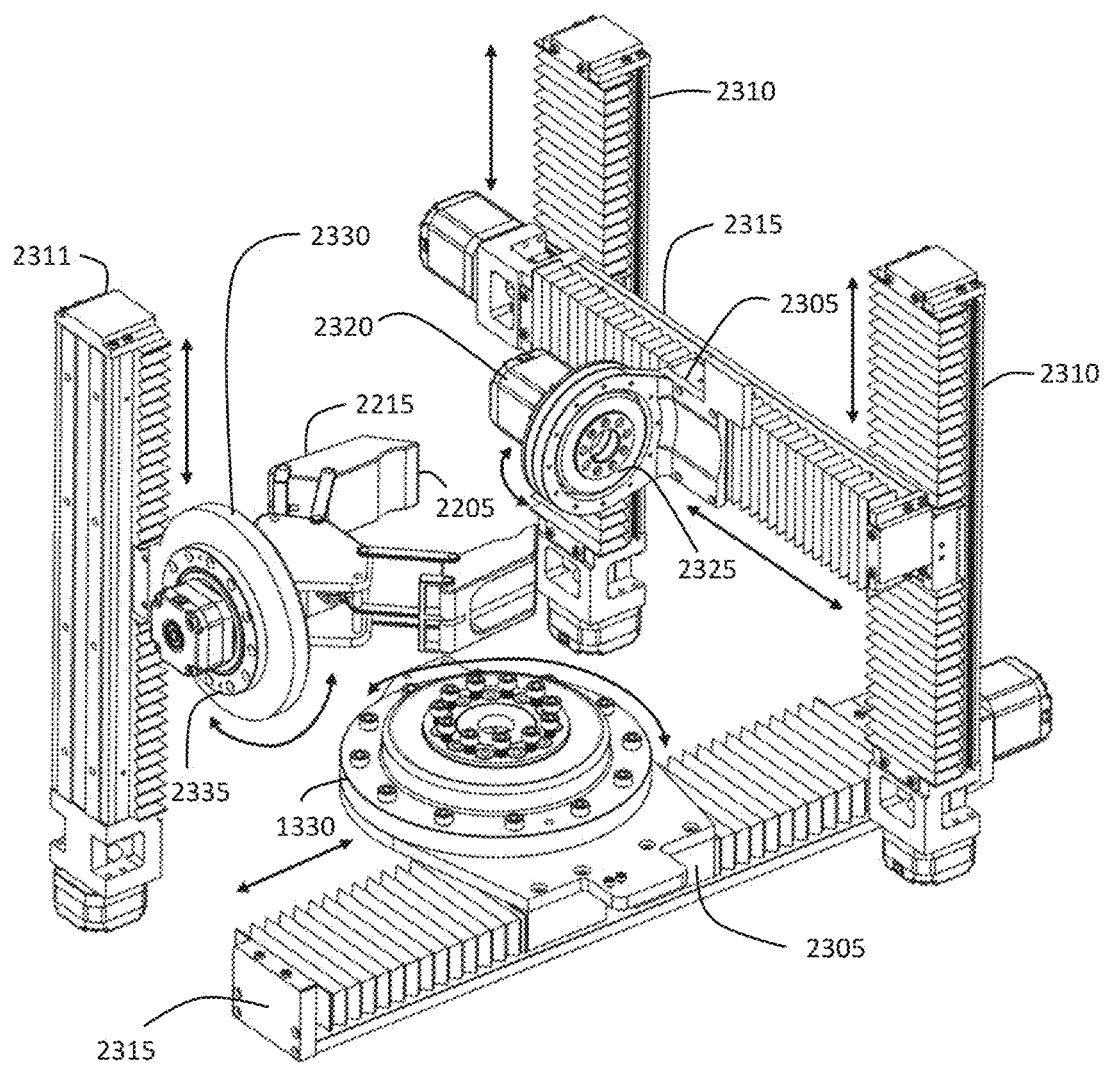
FIG. 23 shows an embodiment of the robotic arm as part of a traverse system.

FIG. 23 shows an embodiment of the robotic arm as part of a traverse system. As disclosed above with respect to FIG. 11, the traverse system 380 may comprise two vertically oriented rails with a moveable bracket 2305, that may be enclosed within bellows (not shown). The moveable brackets 2305 of the two vertically oriented rails 2310 may be connected to a first horizontally oriented rail 2315 and move the first horizontally oriented rail 2315 in the vertical axis.

The first horizontally oriented rail 2315 may include a moveable bracket 2305 and may also be enclosed within bellows (not shown). The moveable bracket 2305 may be arranged for movement in the horizontal axis and may be connected to, or includes, an electromechanical interface assembly 2320 for connecting CNC heads, additive manufacturing deposition heads, scanning heads, and the like. The electromechanical interface assembly 2320 also may include a rotary positioning system 2325 configured to rotate objects attached to the electromechanical assembly 2320 about the horizontal axis. These rails 2310 may be arranged to provide linear vertical (z-axis), linear horizontal (x-axis) and x-axis rotational movement during manufacturing of a part. A second horizontally oriented rail may be included, positioned in the y-axis. A second horizontally oriented rail 2315 may include a movable bracket 2305 and is enclosed within bellows. The rotary table 230 may be attached to the moveable bracket 2305 to which a part manufacturing tray 230 may be permanently or removably attached, enabling linear y-axis movement and rotational movement in the z-axis during manufacturing.

A third vertically oriented rail 2311 is provided for use with the robotic arm 2215. The third vertically oriented rail 2311 may include a movable component 2330 to traverse vertically upon the third vertically oriented rail 2311. The movable component 2330 may include a rotary position system 2325 to rotate the grippers 2205 of robotic arm 330 between 0° and 360°. As shown above with respect to FIG. 22, the third vertically oriented rail 2311 may be attached to an inner surface of the door 410 of an enclosed system. Other arrangements of the traverse system are also possible.

Figure 24:
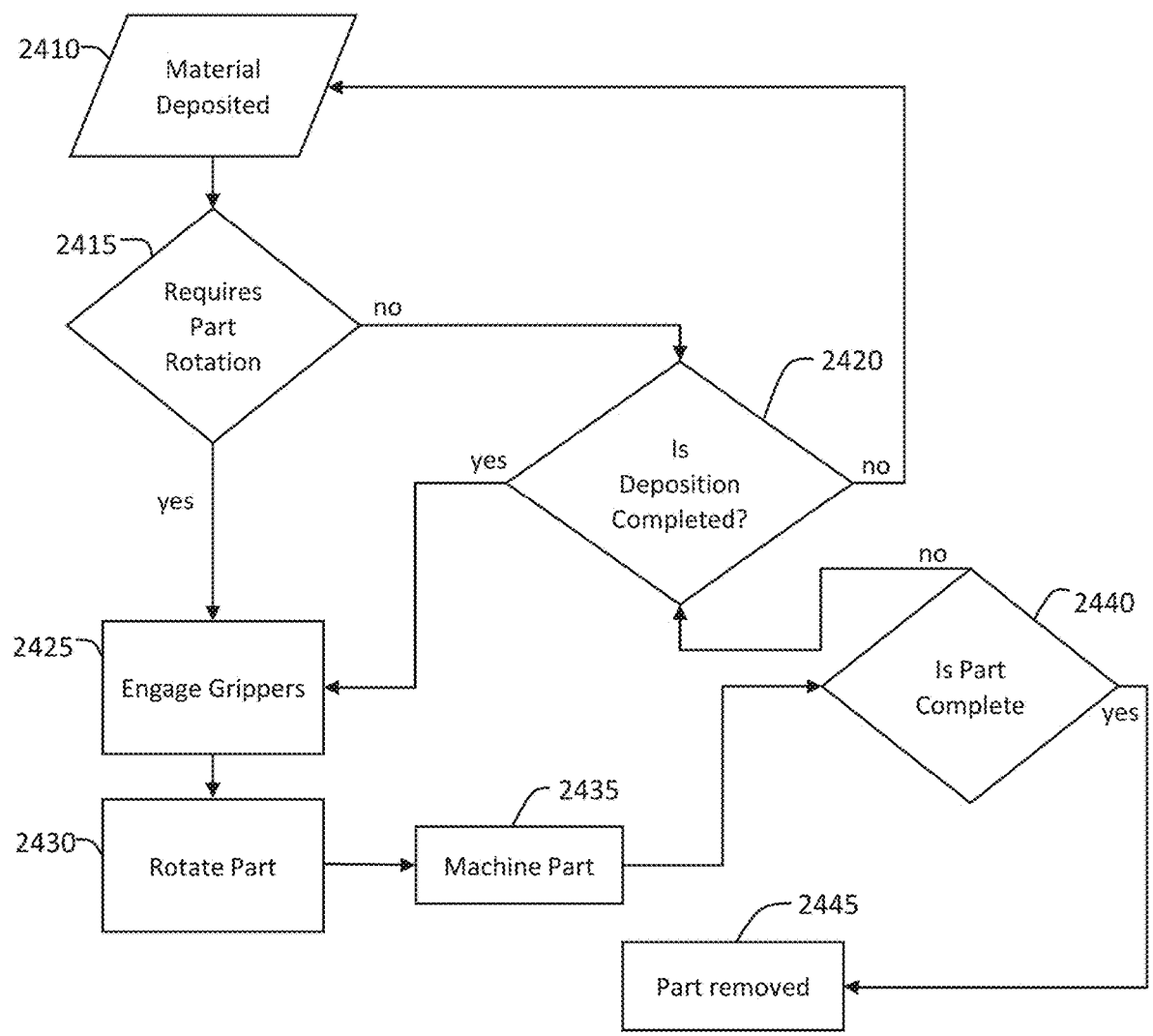
FIG. 24 shows a flowchart of an embodiment of a method for using a robotic arm.

FIG. 24 shows a flowchart of an embodiment of a method for using a robotic arm. The method 2400 comprises depositing deposition material, at 2410. A determination is made whether part rotation is needed, at 2415. If the answer is no, a determination is made whether deposition should cease, at 2420. If the answer is no, further material deposition occurs, at 2410. If the answer is yes, the robotic arm grippers are engaged to grab the part, at 2425. The part is rotated, at 2430, and machined, at 2435, such as, but not limited to, removing smaller bulk material pieces in an effort to finish the part. A further determination is made whether the part is completed, at 2440. If completed, the part may be removed, at 2445, such as, but not limited to, with the grippers. If the part is not completed, a determination is made whether further material deposition is needed, at 2420.

Though FIGS. 22-24 disclose grippers 2205, the term grippers is not limited to a device that has two prongs to fit around a side of an object to squeeze in order to hold the part. Grippers can pertain to any component that can be used to reposition a part. Therefore, as non-limiting examples, the gripper may be a vice-like device, clamps, suction type device, a single probe with a pointed in to pierce an outer surface of a part, an arm that fits within an area built to receive the arm, and the like.

After the initial material deposition, at 2410, if the determination is that the part should be rotated, at 2415, the grippers engage the part, at 2425, and rotates the part, at 2430. As discussed above, the part is then machined, at 2435. If the part is complete, at 2440, it is removed, at 2445. If the part is not complete, a determination is made whether further material deposition must occur, at 2420.

If a determination is made that machining or removal is needed, a machining process is performed. Once completed, a determination is made whether manufacturing is complete and if the part meets dimensional requirements or specifications. If the part is not completed or if the specifications are not met, the process begins again with first determining whether deposition is needed. If the part is completed, the environmental control unit is turned off and the part is removed.

Though a decision whether deposition is shown as occurring before determining whether to machine, these steps, and each's associated manufacturing steps may be interchanged. More specifically, determining whether machining is needed first and then performing the machining process, if needed, may occur prior to determining whether deposition is needed and performing the deposition process.

The embodiments disclosed herein may enable production of metal parts, polymer parts and parts that contain both metal and polymer by implementing swappable deposition heads. Thus, embodiments may be arranged or optimized to support both thermoplastic extrusion and metal welding operations in a single machine or process. Where such manufacturing is performed in a limited area such as, but not limited to, in outer space such as, but not limited to, aboard the International Space Station, a significant advancement in the manufacturing capabilities as currently no method or system exists there for production of metal parts in such environments.

Thus, parts must be designed such that they can be manufactured in such harsh environments as outer space. Often because of the limitations of such environments, sacrifices in the design must be made. Complex internal structures become difficult to achieve when the starting material is solid stock which must be machined away from the exterior to generate the part. Furthermore, additive manufacturing followed by machining is generally only applicable to improving the surface finish of surfaces accessible from the exterior. Fully-enclosed, internal features are difficult or impossible to conduct finishing operations on. By incorporating additive, subtractive, and dimensional verification in a single machine, it becomes possible to machine internal surfaces to meet tolerances in the middle of the manufacturing process, rather than only being able to perform finishing operations at the end.

With an ability to verify that the tool or part meets a desired specification, the embodiments are able to produce and inspect finished polymer and metal parts with one device, eliminating the need for separate additive manufacturing, and subtractive machining, and inspection facilities. The embodiments disclosed herein accomplishes this by utilizing scanning techniques which can be used both to verify final metrology of a part and to detect errors as they occur during manufacturing. This error detection capability, which may be performed with the computing device disclosed herein, allows for corrective action to be taken when needed during the manufacturing process so that the final part is produced defect-free.

Thus, an ability to manufacture plastic or polymer-based material with tighter tolerances is possible. An addition of metal material, which also can be manufactured to tight tolerances, is also possible.

The embodiments disclosed herein may apply to other additive manufacturing techniques to produce parts or bulk materials such as ingots before a subtractive process is utilized. Machining can be performed either lubricated or dried and assisting technologies such as grabbers, brushes, or pressurized gas can be used to free material from a surface. In an embodiment, freeing material from the surface may usually occur after machining to free chips common to machining processes.

A part manufactured with an embodiment disclosed herein may be removed from the build surface in a plurality of ways. In an embodiment, the build surface may become a portion of the end manufactured part, requiring no removal. In another embodiment, the part may be manufactured on or around a smaller bulk material piece which may be machined into the finished part. In another embodiment, the part may be removed by cutting, whether by mechanical means such as, but not limited to, a saw or by higher energetic means such as, but not limited to, a laser or wire electrical discharge machine ("EDM"). In another embodiment water jetting may be used. A sacrificial first layer or build tray may also be utilized and machined off. In yet another embodiment, a release layer, a layer in which does not bond well, may be utilized as a first layer. By doing so, the part may be pulled or knocked off upon completion. As disclosed above, a robotic arm system, with grippers, may be used to assist in any of these removal approaches.

The robotic arm with grippers allows for manipulation and grasping of the part. Thus, the part may be removed from the build surface as well as manipulated and/or held so that a side that originally was not exposed to the manufacturing tools can then be moved into position to utilize the tooling disclosed herein. This serves not just as a mobility option, but can restrain the part and secure it during manufacturing operations. The integration of the manipulation and hold mechanism into the door may also enable a finished part to be easily accessible for a removal operation. The robotic arm system may be located throughout or integrated into other features of the manufacturing system such as, but not limited to, the traverse system disclosed above.

Though not shown, bellows or other protective coverings may be used to protect the hardware from debris that would contaminate or cause mechanical breakdown of the embodiments discussed herein. This debris interference is more likely to occur in reduced gravity due to the lack of settling to a single directional surface.

Figure 25:
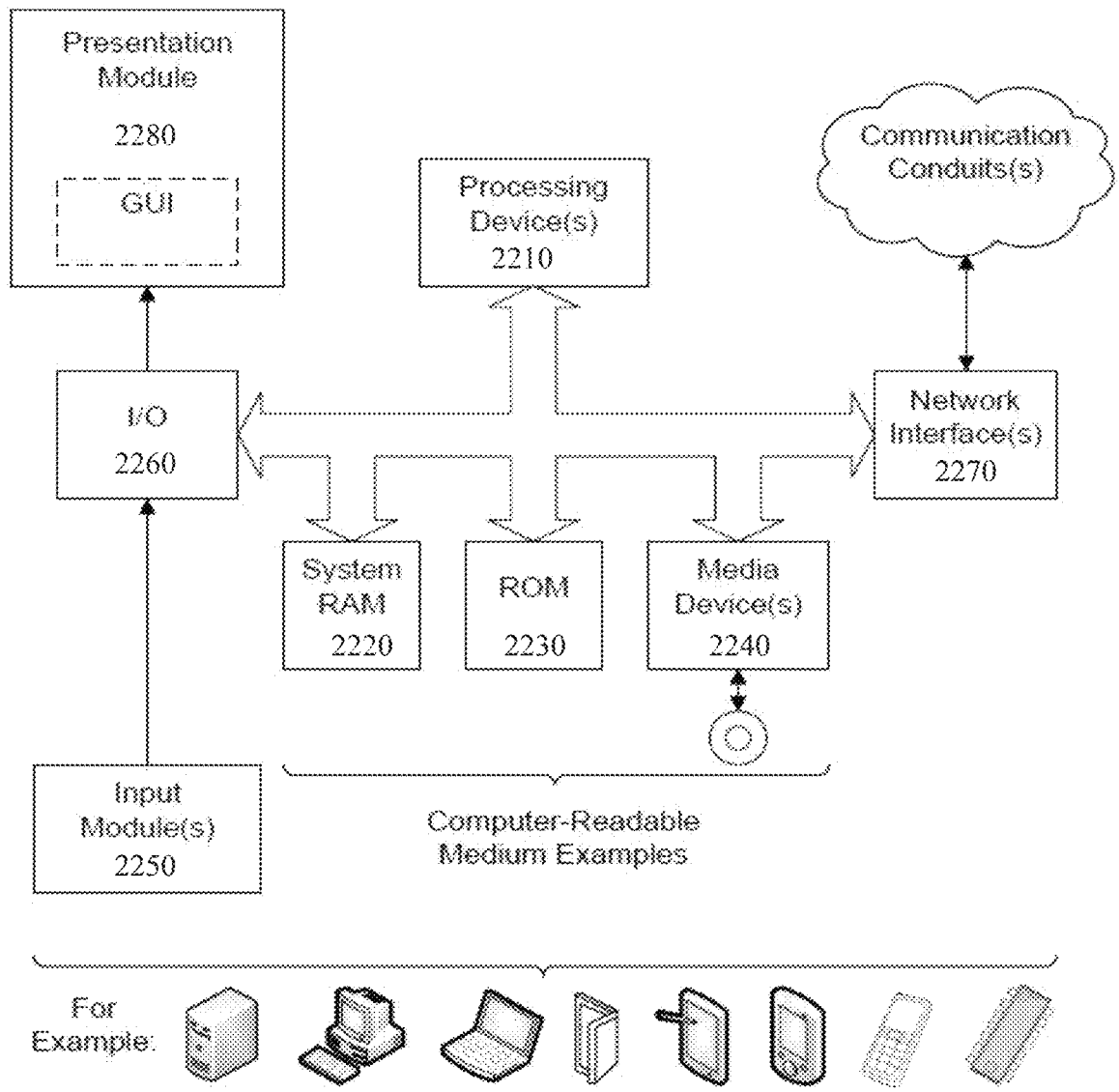
FIG. 25 shows an embodiment of a computing device.

Referring now to FIG. 25, in a basic configuration, a computing device, or subsystem, may include any type of stationary computing device or a mobile computing device. The computing device may be part of avionics/electronics. As disclosed above with respect to the method shown in FIG. 20, the computing device 250 may determine the manufacturing process, including determining whether to machine or apply deposition, how long to perform either function, movements of the rotary bed and movement of the traverse system when creating the part and capturing an image of a part to be recreated, converting the captured image into instructions to create the replacement part, etc.

The computing device may include one or more processors 2210 and system memory in a hard drive. Depending on the exact configuration and type of computing device, system memory may be volatile 2220 (such as RAM), non-volatile 2230 (such as read only memory (ROM), flash memory, and the like) or some combination of the two. A system memory may store an operating system, one or more applications, and may include program data for performing flight, navigation, avionics, power managements operations such as for space operations.

The computing device may carry out one or more blocks of a process and or the additive manufacturing processes described herein. The computing device may also have additional features or functionality. As a non-limiting example, the computing device may also include additional data storage devices 2240 (removable and/or non-removable) such as, for example, magnetic disks, optical disks, or tape. The computer storage media may include volatile and non-volatile, non-transitory, removable and non-removable media implemented in any method or technology for storage of data, such as computer readable instructions, data structures, program modules or other data. The system memory, removable storage and non-removable storage are all non-limiting examples of computer storage media. The computer storage media may include, but is not limited to, RAM, ROM, Electrically Erasable Read-Only Memory (EEPROM), flash memory or other memory technology, compact-disc-read-only memory (CD-ROM), digital versatile disks (DVD) or other optical storage, magnetic cassettes, magnetic tape, magnetic disk storage or other magnetic storage devices, or any other physical medium which can be used to store the desired data and which can be accessed by computing device. Any such computer storage media may be part of device.

The computing device may also include or have interfaces 2260 for input device(s) 2250 such as a keyboard, mouse, pen, voice input device, touch input device, etc. The computing device may include or have interfaces for connection to output device(s) 2280 such as a display, speakers, etc. The computing device may include a peripheral bus for connecting to peripherals. Computing device may contain communication connection(s) 2270 that allow the device to communicate with other computing devices, such as over a network or a wireless network. By way of example, and not limitation, communication connection(s) may include wired media such as a wired network or direct-wired connection, and wireless media such as acoustic, radio frequency (RF), infrared and other wireless media. The computing device may include a network interface card to connect (wired or wireless) to a network.

Computer program code for carrying out operations described above may be written in a variety of programming languages, including but not limited to a high-level programming language, such as C or C++, for development convenience. In addition, computer program code for carrying out operations of embodiments described herein may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed Digital Signal Processor (DSP) or microcontroller. A code in which a program of the embodiments is described can be included as a firmware in a RAM, a ROM and a flash memory. Otherwise, the code can be stored in a tangible computer-readable storage medium such as a magnetic tape, a flexible disc, a hard disc, a compact disc, a photo-magnetic disc, a digital versatile disc (DVD).

The embodiments may be configured for use in a computer or a data processing apparatus which includes a memory, such as a central processing unit (CPU), a RAM and a ROM as well as a storage medium such as a hard disc.

The "step-by-step process" for performing the claimed functions herein is a specific algorithm, and may be shown as a mathematical formula, in the text of the specification as prose, and/or in a flow chart. The instructions of the software program create a special purpose machine for carrying out the particular algorithm. Thus, in any means-plus-function claim herein in which the disclosed structure is a computer, or microprocessor, programmed to carry out an algorithm, the disclosed structure is not the general purpose computer, but rather the special purpose computer programmed to perform the disclosed algorithm.

A general purpose computer, or microprocessor, may be programmed to carry out the algorithm/steps for creating a new machine. The general purpose computer becomes a special purpose computer once it is programmed to perform particular functions pursuant to instructions from program software of the embodiments described herein. The instructions of the software program that carry out the algorithm/steps electrically change the general purpose computer by creating electrical paths within the device. These electrical paths create a special purpose machine for carrying out the particular algorithm/steps.

The embodiments disclosed herein may be used as a computer numeric control ("CNC") tool or system to determine whether manufacturing specifications, or specification requirement, are met for the part and to further machine the part to meet the manufacturing specifications. Thus, by utilizing the embodiments disclosed herein, the a manufacturing process may be automated where the part's mechanical dimensions may be defined using a computer aided drawing computer program where the resulting file is translated into manufacturing directives for embodiments disclosed herein perform. Since manufacturing of the part may require use of a number of different tools, such as disclosed herein, the embodiments disclosed herein may combine the multiple tools into a single manufacturing process performed by a single system 100.

The embodiments disclosed herein may enable production of metal parts, polymer parts and parts that contain both metal and polymer by implementing swappable deposition heads. Thus, embodiments may be arranged or optimized to support both thermoplastic extrusion and metal welding operations in a single machine or process. Where such manufacturing is performed in a limited area, such as, but not limited to in outer space, such as, but not limited to, aboard the International Space Station, a significant advancement in the manufacturing capabilities is possible with the embodiments disclosed herein as currently no method or system exists for production of metal parts in such environments or micro-gravity or varying gravity environments.

Thus, parts must be designed such that they can be manufactured in such harsh environments as outer space. Often because of the limitations of such environments, sacrifices in the design must be made. Complex internal structures become difficult to achieve when the starting material is solid stock which must be machined away from the exterior to generate the part. Furthermore, additive manufacturing followed by machining is generally only applicable to improving the surface finish of surfaces accessible from the exterior. Fully-enclosed, internal features are difficult or impossible to conduct finishing operations on. By incorporating additive, subtractive, and dimensional verification in a single machine, it becomes possible to machine internal surfaces to meet tolerances in the middle of the manufacturing process, rather than only being able to perform finishing operations at the end.

With an ability to verify that the tool or part meets a desired specification, the embodiments are able to produce and inspect finished polymer and metal parts with one device, eliminating the need for separate additive manufacturing, and subtractive machining, and inspection facilities. The embodiments disclosed herein accomplishes this by utilizing scanning techniques which can be used both to verify final metrology of a part and to detect errors as they occur during manufacturing. This error detection capability, which may be performed with the computing device disclosed herein in combination with the geometric part verification subsystem, allows for corrective action to be taken when needed during the manufacturing process so that the final part is produced defect-free.

Thus, an ability to manufacture plastic or polymer-based material with tighter tolerances is possible. An addition of metal material to a part, which also can be manufactured to tight tolerances, is also possible.

The embodiments disclosed herein may apply other additive manufacturing techniques or processes to produce parts or bulk materials, such as ingots before an subtractive process is utilized. Machining can be performed either lubricated or dried and assisting technologies such as grabbers, brushes, or pressurized gas can be used to free material from a surface. In an embodiment, freeing material from the surface may usually occur after machining to free chips common to machining processes.

A part manufactured with an embodiment disclosed herein may be removed from the build surface in a plurality of ways. In an embodiment, the build surface may become a portion or part of the end manufactured part, requiring no removal. Thus for each build, a new build surface 120 is first placed. In another embodiment, the part may be manufactured on or around a smaller bulk material piece which may be later machined into the finished part. In another embodiment, the part may be removed by cutting, whether by mechanical means such as, but not limited to, a saw or by higher energetic means such as, but not limited to, a laser or wire electrical discharge machining ("EDM"). In another embodiment water jetting may be used to dislodge the part. A sacrificial first layer or build tray may also be utilized and machined off. In yet another embodiment, a release layer, a layer in which does not bond well, may be utilized as a first layer. By doing so, the part may be pulled or knocked off upon completion. As disclosed above, a robotic arm 330 may be used to assist in any of these removal approaches.

Though not shown, bellows or other protective coverings may be used to protect the hardware within the enclosure 110 from debris that would contaminate or cause mechanical breakdown of the embodiments discussed herein. Thus, as a non-limiting example, the traverse assembly 380 may have a protective covering protecting it from debris that may be easily moved around within the enclosure 110, especially when in a micro-gravity environment. This debris which could be considered interference is more likely to occur in reduced gravity, such as, but not limited to micro-gravity, due to the lack of settling to a single directional surface.

Unless otherwise defined, all terms (including technical and scientific terms) used herein have the same meaning as commonly understood by one of ordinary skill in the art to which embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In particular, unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such data storage, transmission or display devices.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

The invention claimed is:

1. A system, the system comprising:
   a robotic arm movable about a rotational axis to at least one of move and reposition a part at least one of during part creation and after part creation in a micro-gravity environment, wherein creation is performed by at least one of a polymer-based additive manufacturing subsystem and a metallic-based additive manufacturing subsystem;
   a gripping device attached to the robotic arm which holds the part during at least one of part creation and after part creation;
   a rotary table upon which the part is located during creation, the rotary table is configured to move forward and backward and circular about a center radius of the rotary table; and
   an enclosure having a door to maintain the robotic arm, gripping device and rotary table during part creation to minimize debris from the part creation escaping into the micro-gravity environment;
   wherein the robotic arm is attached to the door of the enclosure to provide for the robotic arm to be removed from the enclosure when the door is opened to provide access within the enclosure.

2. The system according to claim 1, further comprising a traverse system attached to the robotic arm to move the robotic arm, wherein the traverse system is connected to the door of the enclosure and wherein the robotic arm is attached to the door of the enclosure through the traverse system.

3. The system according to claim 2, wherein the traverse system comprises at least one rail attachable to the robotic arm.

4. The system according to claim 3, further comprising a movable component located between the robotic arm and the at least one rail which provides for multiple degrees of movement of the robotic arm about the at least one rail.

5. The system according to claim 4, wherein the movable component provides for rotary movement of the robotic arm up to three hundred and sixty degrees.

6. The system according to claim 1, wherein the gripping device comprises at least one of multiple prongs to fit around a side of the part, a vice-like device, clamps, a suction type device, a single probe with a pointed end to pierce an outer surface of the part, and an arm that fits within an area of the part built to receive the arm.

7. The system according to claim 1, wherein additive manufacturing is performed within the enclosure.

8. The system according to claim 7, further comprising a traverse system attached to the robotic arm to move the robotic arm within the enclosure.

9. The system according to claim 8, wherein the traverse system comprises at least one rail attachable to the robotic arm and attached to an inner surface of the enclosure.

10. The system according to claim 9, further comprising a movable component located between the robotic arm and the at least one rail which provides for multiple degrees of movement of the robotic arm about the at least one rail.

11. The system according to claim 10, wherein the movable component provides for rotary movement of the robotic arm up to three hundred and sixty degrees.

12. A method comprising:
    providing a robotic arm, within a build area in a micro-gravity environment where creation of a part is performed by at least one of a polymer-based additive manufacturing subsystem and a metallic-based additive manufacturing subsystem, wherein the robotic arm is movable about a rotational axis to at least one of move and reposition the part at least one of during part creation and after part creation;
    engaging and disengagement the robotic arm from the part with a gripping device attached to the robotic arm;
    moving the part during creation at least one of forward, backward and circular when the part is upon a rotary table; and
    enclosing the robotic arm, gripping device and rotary table within an enclosure having a door during part creation to prohibit debris from the part creation escaping into the micro-gravity environment wherein the robotic arm is attached to the door of the enclosure to provide for the robotic arm to be removed from the enclosure when the door is opened to provide access within the enclosure.

13. The method according to claim 12, further comprising determining at least one of moving and repositioning of the part based on a desired configuration of the part.

14. The method according to claim 12, further comprising removing the part from the build area once the part is created with the robotic arm.

15. The method according to claim 13, wherein at least one of moving and repositioning of the part comprises rotating the part.

16. A system, the system comprising:
an enclosure having a door located in a micro-gravity environment;
a build area, located in the enclosure, to create a part with at least one of a polymer-based additive manufacturing subsystem and a metallic-based additive manufacturing subsystem, the build area configured to move forward and backward and circular about a center radius of the build area;
a robotic arm with at least a first end attached to the door of the enclosure and a second end movable about a rotational axis to at least one of move and reposition a part at least one of during part creation and after part creation; and
a gripping device attached to the robotic arm which holds the part during at least one of part creation and after part creation;
wherein the robotic arm is removed from the enclosure when the door is opened to provide access to the enclosure.

17. The system according to claim 16, further comprising a traverse system attached to the robotic arm to move the robotic arm.

18. The system according to claim 16, wherein the traverse system comprises at least one rail attachable to the robotic arm.

19. The system according to claim 18, wherein the traverse system provides for multiple degrees of movement of the robotic arm about the at least one rail.

20. The system according to claim 19, wherein the traverse system provides for rotary movement of the robotic arm up to three hundred and sixty degrees.

21. The system according to claim 16, wherein the gripping device comprises at least one of multiple prongs to fit around a side of the part, a vice-like device, clamps, a suction type device, a single probe with a pointed end to pierce an outer surface of the part, and an arm that fits within an area of the part built to receive the arm.

22. The system according to claim 16, further comprising an enclosure around at least a part of the build area.

23. The system according to claim 12, further comprising a traverse system attached to the robotic arm to move the robotic arm, wherein the traverse system is connected to the door of the enclosure and wherein the robotic arm is attached to the door of the enclosure through the traverse system.

* * * * *